(12) United States Patent
Milton et al.

(10) Patent No.: US 10,459,128 B2
(45) Date of Patent: Oct. 29, 2019

(54) LIQUID CRYSTAL DEVICE AND METHOD OF MANUFACTURE

(71) Applicant: The University of Manchester, Manchester (GB)

(72) Inventors: Harry Edward Milton, Manchester (GB); Sarabjot Kaur, Manchester (GB); John Clifford Jones, Manchester (GB); Helen Frances Gleeson, Manchester (GB); Philip Bruce Morgan, Manchester (GB); John Clamp, Manchester (GB)

(73) Assignee: The University of Manchester, Manchester (GB)

( * ) Notice: Subject to any disclaimer, the term of this patent is extended or adjusted under 35 U.S.C. 154(b) by 498 days.

(21) Appl. No.: 14/908,731

(22) PCT Filed: Jul. 30, 2014

(86) PCT No.: PCT/GB2014/052340
§ 371 (c)(1),
(2) Date: Jan. 29, 2016

(87) PCT Pub. No.: WO2015/015205
PCT Pub. Date: Feb. 5, 2015

(65) Prior Publication Data
US 2016/0170097 A1    Jun. 16, 2016

(30) Foreign Application Priority Data

Aug. 1, 2013 (GB) .................................. 1313778.1
Jun. 19, 2014 (GB) .................................. 1410902.9

(51) Int. Cl.
*G02F 1/1335* (2006.01)
*G02F 1/1333* (2006.01)
(Continued)

(52) U.S. Cl.
CPC .......... *G02B 3/14* (2013.01); *B29D 11/00038* (2013.01); *B29D 11/00807* (2013.01);
(Continued)

(58) Field of Classification Search
CPC ............. G02F 1/1333; G02F 1/133305; G02F 1/13306; G02F 1/1347; G02F 1/29;
(Continued)

(56) References Cited

U.S. PATENT DOCUMENTS

| 4,904,063 A | 2/1990 | Okada et al. |
| 7,517,083 B2 * | 4/2009 | Blum .................. G02B 27/017 351/159.44 |

(Continued)

FOREIGN PATENT DOCUMENTS

| EP | 2293136 A2 | 3/2011 |
| EP | 2772792 A1 | 9/2014 |

(Continued)

OTHER PUBLICATIONS

PCT International Search Report dated Oct. 21, 2014 for PCT/GB2014/052340, (5) pages.

(Continued)

*Primary Examiner* — Thoi V Duong
(74) *Attorney, Agent, or Firm* — Linda B. Huber; Nixon Peabody LLP

(57) ABSTRACT

A liquid crystal device (100) for focusing visible light, the liquid crystal device (100) comprising a plurality of curved substrates (101,102) arranged to form one or more curved cavities (104) therebetween, each substrate being configured to provide a focal power, wherein the one or more curved cavities contain liquid crystal and form one or more liquid crystal elements. Each of the one or more liquid crystal elements are configured to provide a focal power, the focal power of each of the liquid crystal elements being dependent (Continued)

on the curvature of the respective cavity and a voltage applied across the liquid crystal contained within the respective cavity. The substrates (101,102) in combination with the one or more liquid crystal elements are arranged to provide a first focal power in a substantial absence of an applied voltage and a second focal power in response to an applied voltage.

20 Claims, 25 Drawing Sheets

(51) Int. Cl.
*G02B 3/14* (2006.01)
*B29D 11/00* (2006.01)
*G02C 7/08* (2006.01)
*G02C 7/04* (2006.01)

(52) U.S. Cl.
CPC ............. *G02C 7/041* (2013.01); *G02C 7/083* (2013.01); *G02F 1/133371* (2013.01); *G02F 1/133526* (2013.01); *G02C 7/04* (2013.01)

(58) Field of Classification Search
CPC ...... G02F 1/133377; G02F 1/133; G02F 1/13; G02F 1/133371; G02F 1/1335; G02F 1/133526; G02F 1/1337; G02F 2001/294; G02B 2027/0178; G02B 27/017; G02B 27/0093; G02B 27/0172; G02B 26/0825; G02B 3/14; C09K 19/02; G02C 7/083; G02C 7/04; G02C 7/00; G02C 7/041; G02C 7/101; G06F 1/163; G06F 3/013; B29D 11/00807; B29D 11/00038
USPC ........ 345/87, 204, 8, 211; 349/158, 200, 33, 349/13, 123, 187; 359/13
See application file for complete search history.

(56) References Cited

U.S. PATENT DOCUMENTS

| 9,829,720 | B2* | 11/2017 | De Smet | G02C 7/022 |
|---|---|---|---|---|
| 2010/0073632 | A1 | 3/2010 | Blum et al. | |
| 2012/0212696 | A1 | 8/2012 | Trajkovska et al. | |
| 2013/0166025 | A1 | 6/2013 | Pugh et al. | |
| 2013/0307473 | A1* | 11/2013 | Han | H02J 7/025 320/108 |
| 2015/0138454 | A1* | 5/2015 | Pugh | A61F 2/1627 349/13 |
| 2016/0106533 | A1* | 4/2016 | Galstian | 349/13 |
| 2017/0097519 | A1 | 4/2017 | Lee | |

FOREIGN PATENT DOCUMENTS

| EP | 2846183 A2 | 3/2015 |
|---|---|---|
| EP | 2851738 A2 | 3/2015 |
| GB | 2487477 A | 7/2012 |
| JP | S55-161390 A | 12/1980 |
| JP | S61-177434 A | 9/1986 |
| JP | 1990019815 A | 1/1990 |
| JP | 08-211399 A | 8/1996 |
| JP | 200429626 A1 | 1/2004 |
| JP | 2005505789 A | 2/2005 |
| JP | 200915995 A | 1/2009 |
| JP | 201066768 A | 3/2010 |
| JP | 2010517081 A | 5/2010 |
| JP | 2010517082 A | 5/2010 |
| JP | 2011118168 A | 6/2011 |
| WO | 2005033782 A2 | 4/2005 |
| WO | 2008091859 A1 | 7/2008 |
| WO | 2012122411 A1 | 9/2012 |
| WO | 2013096781 A1 | 6/2013 |

OTHER PUBLICATIONS

GB Search Report dated Dec. 12, 2013 for Application No. GB 1313778.1, (1) page.
Bao et al. Dependence of Optical Power of LC lens on Cell Gap. SID Digest (2015). 46(1):907-910.
Llorente-Guillemot et al. Visual performance with simultaneous vision multifocal contact lenses. Clin Exp Optom (2012). 95(1):54-59.
Sato, S. Liquid-Crystal Lens-Cells with Variable Focal Length. Japanese Journal of Applied Physics (1979). 18(9):1679-1684.
Sato et al. Relationship between lens properties and director orientation in a liquid crystal lens. Liquid Crystals (1989). 5(5):1435-1442.
Wang et al. Mutlifunctional Superhydrophobic Surfaces Templated from Innately Microstructured Hydrogel Matrix. Nano Lett (2014). 14(8):4803-4809.
Translated Notice of Reasons for Rejection of related Japanese patent application No. 2016-530608, dated Jul. 3, 2018, 8 Pages.

* cited by examiner

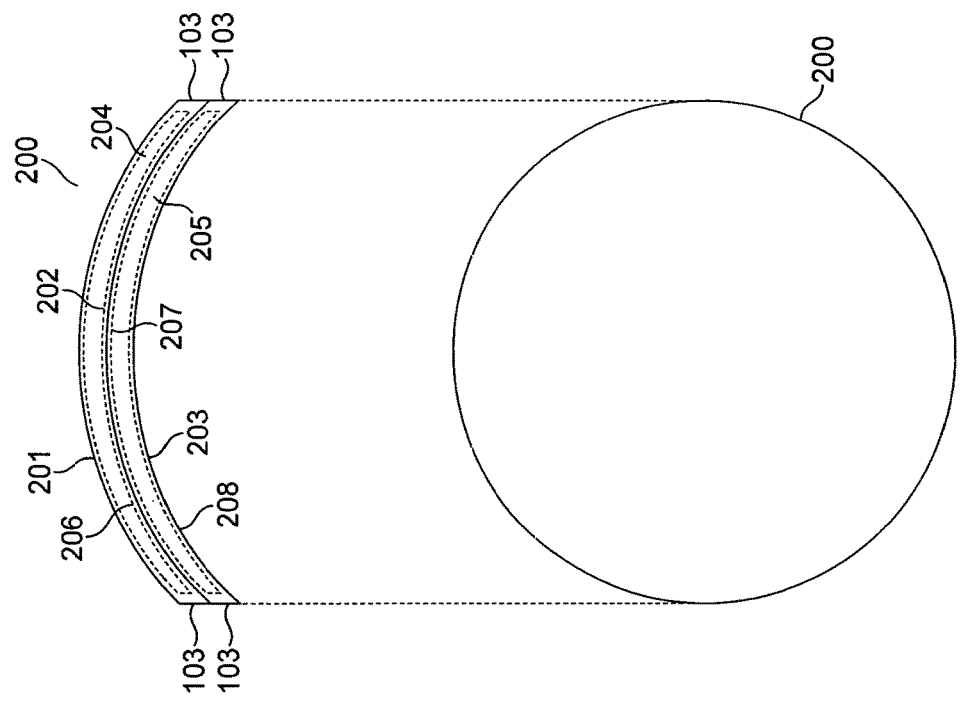
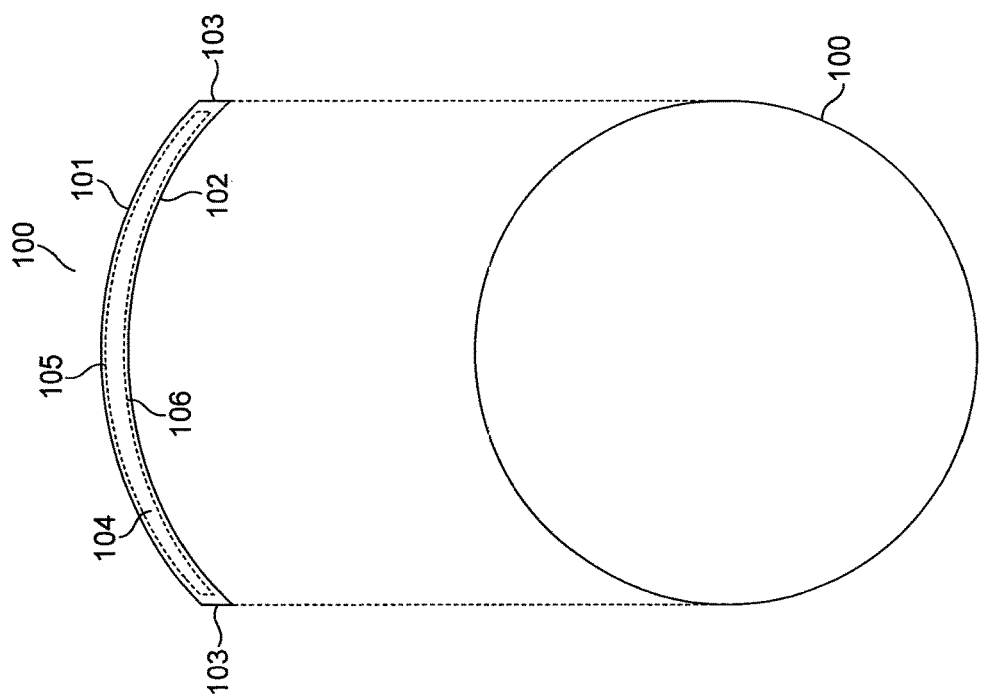

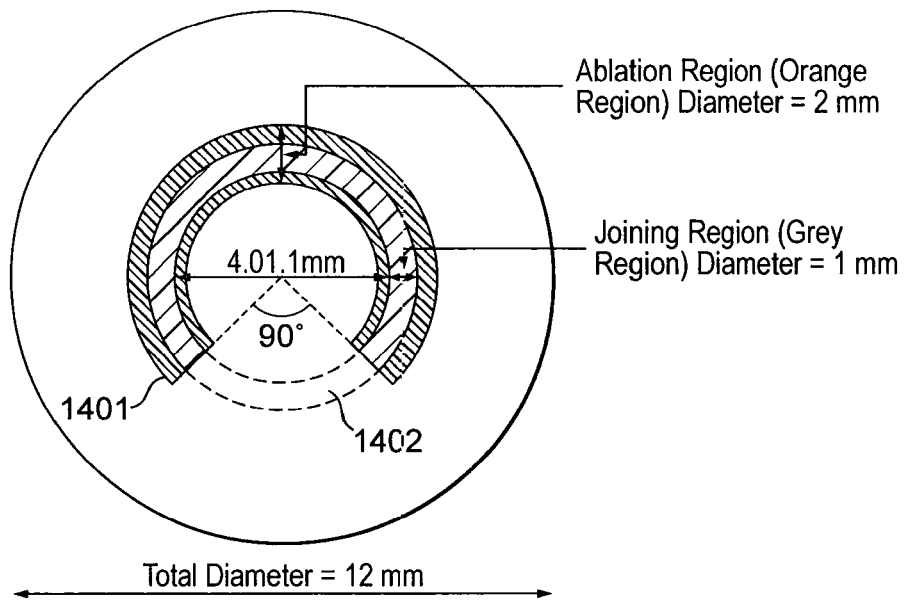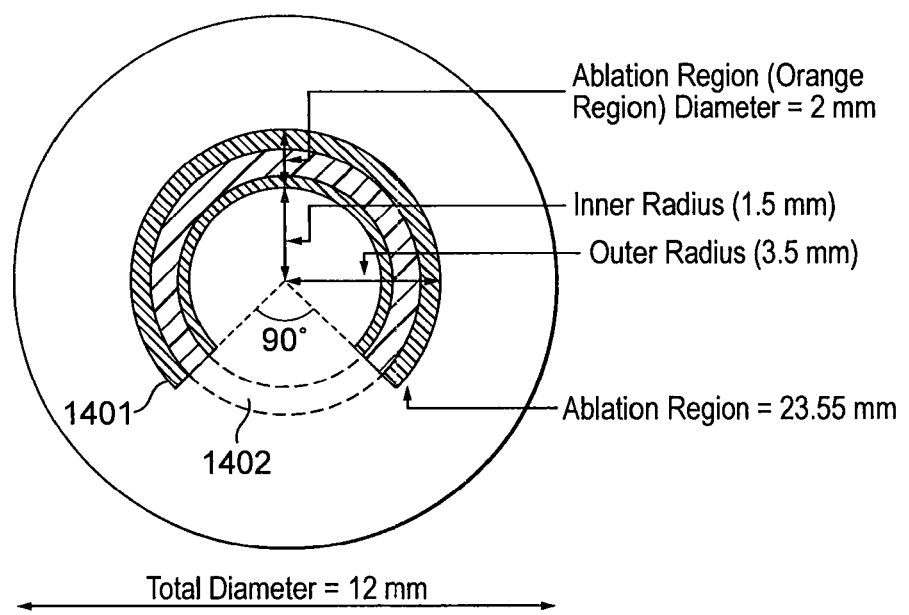
FIG. 27

LIQUID CRYSTAL DEVICE AND METHOD OF MANUFACTURE

CROSS-REFERENCE TO RELATED APPLICATIONS

This application is a National Phase of International Application No. PCT/GB2014/052340, filed Jul. 30, 2014, which designated the U.S. and that International Application was published under PCT Article 21(2) in English. This application also includes a claim of priority under 35 U.S.C. § 119(a) and § 365(b) to British patent application No. GB 1313778.1, filed Aug. 1, 2013 and British patent application No. GB 1410902.9, filed Jun. 19, 2014, the entirety of which are hereby incorporated by reference in their entirety.

FIELD OF THE INVENTION

The present invention relates to liquid crystal devices for focussing light and methods of manufacturing liquid crystal devices.

BACKGROUND OF THE INVENTION

Presbyopia correction has been a focus of research for the spectacle and contact lens industry for a number of years, with a variety of forms of correction proposed and used commercially. However, many current forms of correction are reliant on some form of visual or convenience compromise, and solutions may not achieve a fully corrected field of vision.

Presbyopia is a natural part of human aging, and is one of the greatest issues facing modern optometry due to demographic shifts in population. Issues arising from presbyopia are difficulties performing near vision tasks such as reading and using a computer. The cause of presbyopia is primarily a reduction in performance of the crystalline lens of the human eye which subsequently results in a corresponding reduction of near vision acuity. In order to address the reduction in focusing power of the crystalline lens in presbyopes, an additional lens with a positive power is required for near vision tasks. However, this correction may result in distance vision being distorted, hence specialist products taking the form of spectacles, contacts lenses or surgery are often required for the correction of presbyopia. The most common correction of presbyopia is the use of reading glasses, which can be removed when desired. For patients with myopia or hyperopia, regular corrective lenses may be worn for distance vision tasks, with reading glasses being used for near vision tasks. However this is not an ideal solution, as spectacles require changing depending on the task performed. In addition to reading glasses, various multifocal and varifocal spectacles exist to provide a range of focusing powers, and can be worn at all times. Recent developments have arisen in the field of spectacle lenses, with electronic liquid crystal lenses commercialised. However, liquid crystal lenses are generally limited by their size, and are hence may be more suited for contact lens correction than spectacle correction. However, contact lens options are more limited due to the inconvenience associated with removing and putting on contact lenses. Alternatively, contact lenses have been designed for correction of presbyopia, where the lens is shaped to give a preferential orientation when worn, leading to different focal lengths and corrective powers depending on the direction of view. Such solutions are found to be highly unsatisfactory for the wearer.

STATEMENT OF THE INVENTION

Various further aspects and embodiments of the present invention are provided in the appended claims, including but not limited to:

According to an example embodiment of the present disclosure there is provided a liquid crystal device for focusing visible light, the liquid crystal device comprising a plurality of curved substrates arranged to form one or more curved cavities therebetween, each substrate being configured to provide a focal power, wherein the one or more curved cavities contain liquid crystal and form one or more liquid crystal elements, each of the one or more liquid crystal elements being configured to provide a focal power, the focal power of each of the liquid crystal elements being dependent on the curvature of the respective cavity and a voltage applied across the liquid crystal contained within the respective cavity, and wherein the substrates in combination with the one or more liquid crystal elements are arranged to provide a first focal power in a substantial absence of an applied voltage and a second focal power in response to an applied voltage.

A liquid crystal device having curved substrates and a variable focal power provides an optically active variable focussing means which is suitable for inclusion in a contact lens. The dependence of the focal power on the applied voltage enables the focal power to be controlled and varied across substantially the whole device. This is in contrast to existing devices suitable for inclusion in a contact lens, such as simultaneous vision contact lens, where different areas of the device have different fixed focal powers or conventional liquid crystal devices that are planar and do not comprise a curved cavity. When included in a contact lens, the controllable focal power of the liquid crystal device reduces vision comfort problems associated with existing vision correction products such as simultaneous vision correction contact lenses and bifocal glasses, where portions of these products have for example two fixed focal powers rather than a variable focal power. Furthermore, a focal power of a contact lens in which the liquid crystal device in included may therefore also be electronically controllable.

The liquid crystal device having curved substrates and a variable focal power suitable for use in a contact lens has at least one of the substrates shaped with its outer surface substantially similar to an anterior corneal curvature of the human eye. The one of more cavities containing liquid crystal has at least one internal surface curvature that differs from the anterior corneal curvature of the human eye, and a second internal surface curvature to said one or more cavities that differs from the curvature of the first internal surface curvature, so that the thickness of the liquid crystal varies across the liquid crystal device.

In one example embodiment the curvature and arrangement of the substrates are configured to provide a first focal power.

In another example embodiment the second focal power is more positive than the first focal power.

The provision of a second focal power which is more positive than the first focal power allows the overall focal power of the liquid crystal device to become more positive upon the application of the applied voltage.

In another example embodiment the magnitude of the first focal power is substantially zero.

The provision of a substantially zero first focal power allows the focal power of the device to be approximately zero when there is a substantial absence of an applied voltage. When included in a contact lens, this allows a connect lens to have a default focal power of approximately zero, such as for example may be required for a user who only requires distance vision correction.

In another example embodiment at least one of the liquid crystal elements has a non-uniform spacing between the containing substrates.

The provision of non-uniform thickness liquid crystal elements allows more flexible configuration of the focal power provided by the one or more liquid crystal elements.

In another example embodiment the liquid crystal device is arranged to provide the second focal power in response to the applied voltage exceeding a predetermined voltage.

The use of a predetermined voltage allows the focal power of the liquid crystal device to be switched from the first to the second focal power reliably.

In another example embodiment an aggregate focal power provided by the one or more substrates is positive.

In another example embodiment an aggregate focal power provided by the one or more liquid crystal elements is negative.

The provision of positive and negative aggregate focal powers by the one or more substrates and the one or more liquid crystal elements, respectively allows a balanced liquid crystal device to be achieved where a proportion of the negative focal power of the one or more liquid crystal elements is balanced out by the positive focal power of the one or more substrates.

In another example embodiment at least one of the substrates is shaped substantially similarly to an anterior corneal curvature of a human eye.

A liquid crystal device having at least one substrate shaped substantially similarly to an anterior corneal curvature of a human eye may increase its suitable for inclusion in a contact lens.

In another example embodiment the liquid crystal device comprises three substrates arranged to form two curved cavities therebetween.

In another example embodiment the liquid crystal device comprises two liquid crystal elements and the liquid crystal directors of the liquid crystal of each of the liquid crystal elements are substantially orthogonal.

In another example embodiment the surfaces of the substrates that form the one or more cavities each comprise an electrode, the electrodes of each cavity configured to apply the voltage to the liquid crystal contained in the respective cavity.

The provision of two cavities with liquid crystal with orthogonal directors enables the liquid crystal device to provide focussing of light which is polarisation independent when the liquid crystal within each cavity substantially affects only one polarisation of light.

In another example embodiment the liquid crystal device comprises two liquid crystal elements and the liquid crystal directors of the liquid crystal of each of the liquid crystal elements are arranged so that the polarisation state of light transmitted by the first cavity is substantially orthogonal to the light transmitted by the second cavity.

In another example embodiment the liquid crystal device comprises three substrates forming two substantially parallel cavities and one of the three substrates forms a wall of each of the two cavities.

The use of three substrates allows the two cavities to share a central substrates and therefore overcomes the need to attach two-substrates back to back.

In another example embodiment the liquid crystal device comprises three substrates which form two liquid crystal elements and the electrodes are arranged to apply a first voltage across the liquid crystal of a first of the two liquid crystal elements and to apply a second voltage across the liquid crystal of a second of the two liquid crystal elements.

In another example embodiment, the liquid crystal device comprises four substrates which form two liquid crystal elements with the external curvature of the two central adjacent surfaces to be equivalent. This is to allow optical contact to be ensured, perhaps with an index matching adhesive between the two liquid crystal elements.

The use of four substrates in this manner allows the two lens cavities to be fabricated separately and then mounted back to back.

The provision of first and second voltages across the liquid crystal elements allows independent control to be established over each of the liquid crystal elements.

In another example embodiment the liquid crystal device comprises a battery configured to provide electrical power to the electrodes.

The use of a battery in the liquid crystal device allows the electrodes to be powered without attachment to a power source which is external to the device. This therefore allows the device to be self contained and further suitable for use in a contact lens.

In another example embodiment the liquid crystal device comprises a receiver induction coil, the receiver induction coil configured to receive electrical power from a transmitter induction coil, and provide the received electrical power to the electrodes.

The use of an induction coil to provide power to the electrodes alleviates the need for a power source to be included in the liquid crystal device. For example, the transmitter induction coil may be placed nearby to the liquid crystal device rather than being included in the liquid crystal device as a battery would be. Furthermore, the use of an inductor coil arrangement allows the power provided to the liquid crystal device to be controlled via the transmitter coil and therefore fewer control elements may be required in the liquid crystal device compared, for instance, to using a battery as a power source.

In another example embodiment the liquid crystal device comprises means for storing charge configured to provide electrical power to the electrodes together with a receiver induction coil configured to receive electrical power from a transmitter induction coil and provide charge to the means of charge storage. For example, the means for charge storage may be a capacitor, a super-capacitor or a re-chargeable battery.

In another example embodiment the liquid crystal device comprises electronic circuitry in addition to the means of supplying electric charge. For example, the lens may comprise circuitry to amplify the signal received from a receiver induction coil to provide a sufficient voltage to the liquid crystal elements to ensure that the focal power of the lens in the voltage on state is independent of the distance between the receiving and transmitting induction coils.

In another example embodiment the invention provides a device for focusing visible light comprising a plurality of curved substrates arranged to form one or more curved cavities therebetween, each substrate being configured to provide a focal power, wherein the one or more curved cavities contain an electro-optic medium and form one or more elements, each of the one or more elements being configured to provide a focal power, the focal power of each of the elements being dependent on the curvature of the respective cavity and a voltage applied across the electro-optic medium contained within the respective cavity, and wherein the substrates in combination with the one or more elements are arranged to provide a first focal power in a substantial absence of an applied voltage and a second focal power in response to an applied voltage.

In another example embodiment the invention provides liquid crystal device for focusing visible light, the liquid crystal device comprising a plurality of substrates arranged to form one or more curved cavities therebetween, wherein at least one of the substrates is shaped substantially similar to an anterior corneal curvature of a human eye, the one or more cavities contain liquid crystal, the one or more cavities containing liquid crystal forming a liquid crystal element, and a focal power of the liquid crystal element is dependent on a voltage applied across the liquid crystal, whereby the focal power of the liquid crystal device is dependent on the applied voltage.

In another example embodiment, the invention provides a method of manufacture of a liquid crystal device, the method including manufacturing a plurality of curved substrates, applying a conductive coating to one or more of the surfaces of each of the substrates, the conductive coating configured to form an electrode on each of the one or more surfaces, processing the conductive coated substrate surfaces to form a liquid crystal alignment inducing surface, adhering at least two substrates to one another to form one or more cavities therebetween, the liquid crystal alignment inducing surfaces forming interiors of the one or more cavities, and filling the one or more cavities with liquid crystal.

In another example embodiment, the invention provides a method of manufacture of a liquid crystal device for focusing visible light, the method including manufacturing a plurality of substrates, the substrates shaped substantially similarly to an anterior corneal curvature of a human eye, applying a conductive coating to one or more of the surfaces of each of the substrates, the conductive coating configured to form an electrode on each of the one or more surfaces, processing the conductive coated substrate surfaces to form a liquid crystal alignment inducing surface, adhering at least two substrates to one another to form one or more cavities therebetween, the liquid crystal alignment inducing surfaces forming interiors of the one or more cavities, and filling the one or more cavities with liquid crystal.

In another example embodiment, the filing of the one or more cavities with liquid crystal includes submersing, in a substantial vacuum, the adhered substrates in liquid crystal.

In another example embodiment, applying the conductive coating includes applying the conductive coating via cold vacuum sputtering.

In another example embodiment, applying the conductive coating includes applying a coating configured to increase the adherence of the conductive coating to the one or more surfaces of the substrates.

Also provided is a contact lens including a liquid crystal device according to the invention.

In one preferred embodiment, the liquid crystal device is included by means of piggybacking.

In one preferred embodiment, the contact lens is formed from a rigid gas permeable material.

In one preferred embodiment, the contact lens is formed from a soft contact lens material.

Also provided is the use of a liquid crystal device according to the invention in the manufacture of a contact lens.

Also provided is the use of a method according to the invention in the manufacture of a contact lens.

Various further aspects and features of the present disclosure are defined in the appended claims and include a method of manufacture.

BRIEF DESCRIPTION OF THE DRAWINGS

Embodiments of the present invention will now be described by way of example only with reference to the accompanying drawing in which like parts are provided with corresponding reference numerals and in which:

FIG. 1 provides a schematic diagram of a liquid crystal device in accordance with an embodiment of the present invention;

FIG. 2 provides a schematic diagram of a liquid crystal device in accordance with an embodiment of the present invention;

FIG. 27 provides an illustration of an example lens electrode design patterned, for example, using laser ablation process for removal of the transparent conducting material to prevent short circuits.

DETAILED DESCRIPTION OF EXAMPLE EMBODIMENTS

Figure 3:
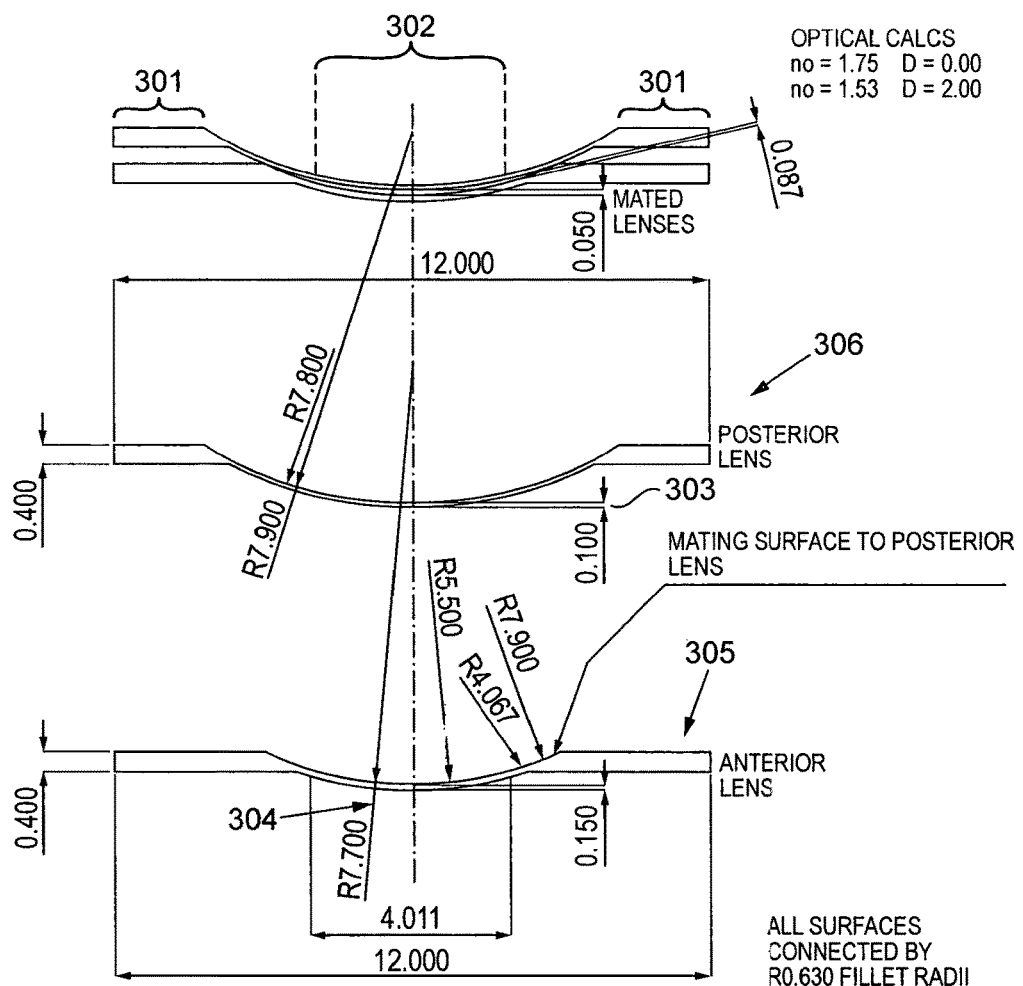
FIG. 3 provides a schematic diagram of substrates of a liquid crystal device in accordance with an example embodiment of the present invention.

In recent years presbyopia correction through the use of contact lenses has been an area of research and development, with numerous designs now available. In terms of prescription trends internationally, the majority of contact lens wearers above the age of 45 currently wear non-presbyopia correcting lenses, with smaller proportions using monovision corrections and multifocal lenses. However, in the UK for example, monovision correction is more popular, with roughly equal corrections using monovision and simultaneous vision lenses. There has been a shift towards multi-focal lenses and away from monovision internationally which may be due to low monovision success rates, new corrective products becoming available, along with additional training and acceptance of simultaneous vision lenses by opticians.

Additional disadvantages of monovision lenses may include a lack of intermediate vision for computer use, discomfort from blur suppression, difficulty arising from the fluidity of ocular dominance, lack of periphery visual acuity, and reduction in depth perception. Studies have shown that modern aspheric multifocal lenses may have a significant advantage over monovision corrections in terms of patient satisfaction. More recent studies comparing monovision to multifocal lenses also reported a preference of multifocal lenses over monovision. In terms of visual acuity, the differences between simultaneous vision and monovision may be less obvious. For example, a study showed monovision fittings performed better for near visual acuity, and multifocal aspheric centre near lenses provided better stereoacuity and range of clear near vision. Other studies have also noted that monovision wearers may experience difficulties with depth perception when compared to simultaneous vision corrections, with more users reporting difficulty with monovision compared to reporting difficulty with bifocals. It has also been noted that, when comparing monovision to simultaneous vision, there was reduction of stereopsis with monovision contact lens wearers, along with a corresponding decrease in depth perception acuity in most cases.

Simultaneous vision corrections often have associated compromises in vision and comfort, as illustrated by a relatively low take-up by contact lens wearers over the age of 45. Aspheric lenses dominate markets due to their provision of intermediate correction. A recent study by Llorente-Guillemot et al. (Clinical and Experimental Optometry, 95, 54-59; 2012) with a modern aspheric lens showed that spectacle lenses still outperformed multifocal contact lenses in terms of contrast sensitivity and near and distance visual acuity. Additionally, there may be performance issues with multifocal lenses when performing dynamic tasks such as driving in low light conditions, with some users noting distortion of peripheral vision, poorer viewing of the dashboard and shorter legibility distances for road markings compared to spectacle wearers. For example, an issue with simultaneous vision lenses is that they are reliant upon visual compromises, especially in relation to pupil size, which means that these lenses may be outperformed by spectacles. Hence to improve the proportion of presbyopia corrections using contact lenses new approaches are required, without the associated visual compromises present in current corrections.

Bifocal spectacles generally use the principle of alternating vision, which requires some adjustment for the user and may not provide a full corrected field of vision. Liquid crystal lenses have been suggested as a solution for presbyopia correction with a recent development of a prototype device that utilises a diffractive liquid crystal lens in a pair of spectacles lenses. This is a form of correction that is not reliant upon visual compromises associated as with standard presbyopia corrections, with an additional optical power being induced by the lens when a voltage is applied. Additionally, there has been renewed attention regarding contact lenses outside vision correction, with prototype devices used for measuring intraocular pressure and augmented vision with light emitting diodes for example. If a liquid crystal lens device can be adapted for contact lens use, it may provide full field switchable correction for presbyopia without the visual compromises typically associated with contact lens correction.

Liquid crystal lenses have been suggested since the 1970s, for example by S. Sato (1979) Jap. J. Appl. Lett., v18, no. 9, pp 1679-1684, wherein plano-convex and plano concave lens structures filled with a liquid crystal were used to cause a change to a lenses focussing power. It was quickly realised that these geometries were impractical for larger lens geometries, S. Sato, T. Nose, R. Yamaguchi and S. Yanase (1989) Liq. Cryst., v5, no. 5, pp. 1435-1442, and gave small changes in focusing power unless excessively large changes in cell gap were used. To some extent, these issues were solved using a patterned substrate to give a Fresnel lens arrangement, such as in U.S. Pat. No. 4,904,063 and EP02293136A2. Alternatively, a flat liquid crystal layer could be used in which a dielectric layer was added to the liquid crystal element to cause lensing from the liquid crystal orientation under the effect of the applied field (Ye et al. (2002). Such methods add complex manufacturing steps to the lenses and lead to much higher voltages being required. Advantages of the present invention include low voltage operation of a switchable lens, with sufficient change in focal power for the presbyopic user, and has been suggested for use in contact lenses in US 2013/0166025 A1.

FIG. 1 provides a schematic diagram of a cross section and a top down view of a liquid crystal device 100 in accordance with a first example embodiment of the present disclosure. The liquid crystal device focusses visible light and may for example be utilised as an optically active part of a contact lens for presbyopia or other vision correction. The liquid crystal device is formed from a plurality of substrates 101, 102 which are arranged and adhered together to form a curved cavity 104 which when filled with liquid crystal forms a liquid crystal lens which may also be referred to as a liquid crystal element or layer. The substrates 101 and 102 are separated by one or more spacers 103 which determine the depth of the cavity 104, where the curvatures of each substrate vary slightly in order to ensure a cavity of appropriate thickness for use as a liquid crystal lens with a set of desired properties. For instance, the radius of the curvature of the lower or back substrate 102 will be different than radius of the curvature of the upper substrate 101. By different curvature, we refer to two curves that have different centres of curvature, or have both different centres and radii of curvature. The spacers may be separate to the substrates, formed as part of the substrates, or formed from adhesive adhering the substrates to one another, thereby simplifying construction of the liquid crystal device. The substrates are approximately circular when viewed from a top down perspective and the curvature of the cross section of at least one of the substrates is shaped substantially similarly to the anterior curvature of a human cornea. The combination of these shapes results in a device similar in shape to a conventional contact lens thus allowing the liquid crystal device to be placed on to the eye of a wearer in a similar manner to a contact lens or for the liquid crystal device to be included in a contact lens. For example, the base curvature of the lower substrate 102 may be approximately 7 mm to 10 mm, which is the typical range of curvatures of commercially available contact lenses. The cavity 104 is configured to be filled with a liquid crystal where the bulk refractive index of the liquid crystal is dependent on an electric field or voltage applied across the cavity and the liquid crystal contained therein. One or both of the surfaces of the substrates which form the cavity may have a conductive coating applied that form electrodes 105 and 106 (dashed lines) that are configured to apply the voltage across the liquid crystal layer. The shape, material and refractive index of the substrates and liquid crystal are configured to focus visible light as will be explained in more detail below.

As is well-known and will be explained in more detail below, the arrangement of molecules in standard liquid crystal (the liquid crystal director) determines the behaviour of liquid crystal with regards to the polarisation of the light passing through the liquid crystal. For instance, referring to the example embodiment of FIG. 1 with a single nematic liquid crystal layer with the director arranged to be homogeneously parallel across the cavity, light with a polarisation parallel to the liquid crystal director will experience the change in refractive index when a voltage is applied from $n_e$ to $n_o$. However, light with a polarisation perpendicular to the liquid crystal director may not experience the change in refractive index with respect to voltage and therefore will be unfocussed. Consequently the example embodiment illustrated in FIG. 1 is polarisation dependent as there is a single liquid crystal layer that predominantly affects light of only one polarisation. However, as is described below with reference to further example embodiments, the principles of polarisation dependent liquid crystal layers may be utilised to form more complex devices which are not polarisation dependent, for instance, devices with two liquid crystal layers.

In order to achieve a focussing liquid crystal device, the curvature, thickness and materials from which the substrates 101 and 102 are constructed are configured in combination to provide a fixed focal power, where the substrates may each provide substantially similar or different focal powers. For example, to achieve a focal power of 6.5 diopters, the upper and lower substrates may provide focal powers of 0.5 and 6 diopters respectively, or 3.25 diopters each. As is explained below, this fixed focal power may then be supplemented with additional focal power provided by the liquid crystal layer or layers, whose focal power is controllable via a voltage applied across the liquid crystal layer. For example, for presbyopia correction where no refractive correction is required, the fixed focal power of the substrates may be approximately +2.00 diopters and the focal power of the liquid crystal lens may be operable to be adjusted between −2.00 diopters in the non-active state and 0 diopters in the active state in order to achieve a balanced arrangement. Consequently, the focal power of the liquid crystal device may vary from 0 diopters to +2.00 diopters. Although this example concerns presbyopia correction, in other examples the focal power of the substrates and the liquid crystal layer may be configured to be either be stronger or weaker. For instance, the substrates and liquid crystal layer may be configured to achieve focal powers such that there is refractive correction in the non-active state, thus allowing for the correction of distance vision, near vision or the correction of both near and distance vision. In one example embodiment, the substrates may be configured to provide a focal power of 6.5 diopters and the liquid crystal layer may be configured to switch between −6.5 and −4.5, thus achieving a liquid crystal device that switches between 0 and +2 diopters.

The substrates may be formed from any suitable material that can provide the desired focal power and robustness required for the manufacturing process described below. In some example embodiments the plastic polymethyl methacrylate (PMMA) may be a suitable material from which to form the substrates because of its high biocompatibility, comfort and flexibility when utilised in contact lenses. As previously mentioned, the refractive index of the liquid crystal contained within the cavity 104 is partially dependent on a voltage that is applied across the liquid crystal by the electrodes 105 and 106. For example, in some embodiments, for light polarised parallel to the liquid crystal director, in the absence of an applied voltage the liquid crystal will have a refractive index of approximately $n_e$ and when a voltage is applied the refractive index will vary between $n_e$ and $n_o$ dependent upon the applied voltage. The focal power of a substance is partially dependent on, among other factors, the shape of the substance, the refractive index of the substance and the temperature of the substance. The focal power of the liquid crystal layer may also be varied by varying the applied voltage. In the first example embodiment, by controlling the above factors, the liquid crystal layer may for example be configured to have a focal power approximately equal and opposite to that of the substrates when an applied voltage is substantially zero or below a predetermined threshold at which the bulk refractive index of the liquid crystal transitions towards $n_o$. The combinations of the focal powers of the liquid crystal layer and substrates in this example results in an approximately balanced optical system where the overall focal power of the liquid crystal device is approximately zero when a voltage of substantially zero or a voltage below a predetermined threshold is applied to the liquid crystal. When a voltage above the threshold voltage is applied to the liquid crystal, it is configured to reduce the focal power of the liquid crystal layer such that the overall focal power of the liquid crystal device is increased due to the contribution of the positive focal power of the substrates. In terms of use as a contact lens for the correction of presbyopia, these characteristics of the liquid crystal device present a number of advantages. Firstly, the balanced optical system of the liquid crystal device allows the device to be passive when a voltage is not applied to the liquid crystal so that for viewing objects at a long distance little or no power is consumed by the liquid crystal device. Consequently, substantial power is consumed only when an active focussing system is required, for example, when presbyopia correction is required. Furthermore, the balanced arrangement allows the liquid crystal device to be effectively turned-on and turned-off instead of simply adjusting the focal power between two zero non-levels, thus making it suitable for presbyopia correction when a focal power of zero is required when distance objects are being viewed. Although in the previous paragraphs the examples of the liquid crystal device has been described as a 'negatively' balanced device i.e. the liquid crystal provides negative focal power equal in magnitude to the focal power of the substrates when it is in the off-state, the liquid crystal device may also be 'positively' balanced in some example embodiments and in other be unbalanced. However, the exact balancing and focal power required will be dependent on requirements of the user which is to wear the liquid crystal device in a contact lens or the requirements of the application if the liquid crystal device is utilised in other industries. For example, by adjusting the properties of the substrates and the liquid crystal layer, the liquid crystal device may be configured to transition between aggregate focal powers such as two positive focal powers, between positive and negative focal power or vice versa, and between two negative focal powers. In some example embodiments a liquid crystal with a twisted geometry could be used to form the liquid crystal layer. Use of such a liquid crystal may reduce the polarisation dependency of the liquid crystal device and therefore may improve the performance of the liquid device when non-polarised light is to be focussed.

Figure 4:
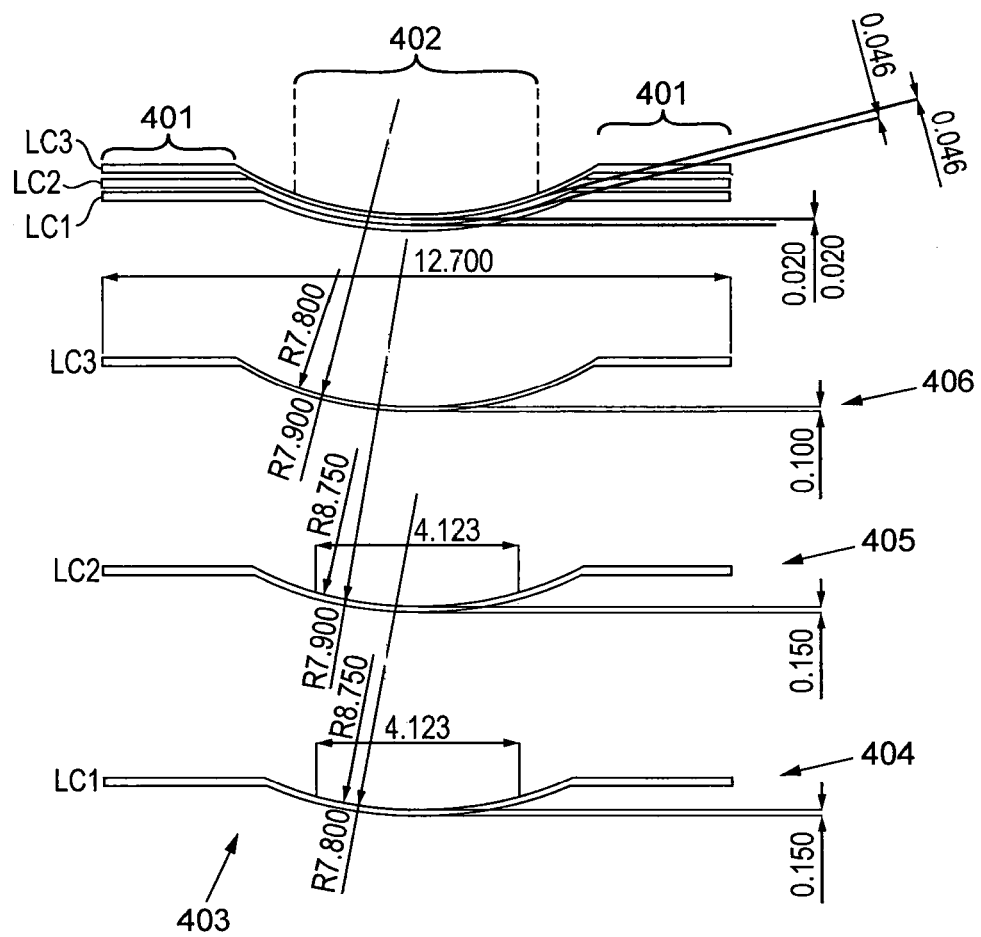
FIG. 4 provides a schematic diagram of substrates of a liquid crystal device in accordance with an example embodiment of the present invention.

In FIG. 1, and as can also be seen in FIGS. 2 to 4, the substrates 101 and 102 and 201, 202 and 203 are curved as opposed to flat or planar substrates which are conventionally found in electro-optic liquid crystal devices. Parallel planar or flat (to a high tolerance) substrates are conventionally used for a number of reasons, for example:

The liquid crystal thickness will be uniform so the effective birefringence of the layer is also uniform. This is important to the optical appearance of the device, especially where polarizers are included as is the case for display devices.

The alignment of the liquid crystalline layer will be uniform, optimizing the optical appearance of the device.

The response time of the device, which depends on the device thickness, is more uniform.

The fabrication methods used to make display devices, including photolithography, are not conducive to use on curved surfaces. Each panel is fabricated from motherglass (or plastic) that is laminated to form a multitude of liquid crystal elements alongside each other. Individual panels are only singulated after completion of the back-end process. This necessitates that the devices are designed to be flat, and with the internal surfaces parallel to each other.

Consequently, devices that incorporate curved surfaces such as those included in FIGS. 1 to 4 and that rely on birefringence would likely have an unacceptable optical appearance. There would also be issues related to the off-axis performance of such devices. It would also be likely to be unacceptable for most devices if the response time of the device to be different in different regions i.e. non-uniform. However, in the devices of the present disclosure, it is important that the substrates are curved and have surfaces which have different curvatures. Although one curved surface and one flat surface may be used in combination in the prior art, it is likely that in such a device the curvature geometry needed to obtain desired focusing power would make the optics of the lens unacceptable.

The use of two or more curved surfaces with different curvatures allows desired focal powers to be achieved and thus appropriate focussing to be obtained. However, unexpectedly a number of conventional disadvantages with curved substrates devices are overcome or are not relevant for contact lenses. For example, in contact lenses designed according to the present invention, off axis elements are not as important, contrary to the case with planar parallel display devices. Also in contrast to conventional display devices, the fact that the system may experience dynamics that can include scattering is not as problematic as it is in the production of images such as animated images on display devices. Although due to the non-uniformity of the curved device there may be a slight difference in response time in different regions of the switchable lens, this may not be noticeable in the configuration of a contact lens as it is out of focus during switching.

FIG. 2 provides a schematic diagram of a cross section and a top down view of a polarisation independent liquid crystal device for focussing light. The shaping of the substrates and cavities are substantially similar to that of the example embodiment of FIG. 1 and therefore the liquid crystal device is also suitable for use as a contact lens or the optically active element of a contact lens. The liquid crystal device 200 is substantially similar to the one previously described with regards to FIG. 1 but has three substrates 201, 202, 203 which approximately match the corneal curvature of a human eye. The substrates in combination with the spacers 103 are arranged and adhered to form two liquid crystal cavities or layers 204, 205. The upper portion of the liquid crystal device is formed from the substrates 201 and 202 and the electrodes 205 and 206, where a voltage is applied to the liquid crystal across the cavity 204 by the electrodes 205 and 206. The lower portion of the liquid crystal device is formed from the substrates 202 and 203 and the electrodes 207 and 208, where a voltage is applied to the liquid crystal across the cavity 205 by the electrodes 207 and 208. The central substrate 202 has an electrode on both sides and only a single voltage is required to apply a voltage across both cavities when the voltage is applied to the electrodes 206 and 207. In an example arrangement, the electrodes 206 and 207 are shorted together as are the electrodes 205 and 208. In this fashion, the field is applied simultaneously across both cavities 204 and 205. As with the example embodiment of FIG. 1, the substrates are configured in combination to provide a fixed focal power, which in the case of a contact lens for presbyopia correction for example would be a positive focal power. In an example embodiment configured for presbyopia correction without any refractive correction, the liquid crystal layers may be configured to provide a negative focal power which is approximately equal in magnitude to the focal power provided by the substrates when a voltage below a threshold voltage is applied to the liquid crystal. Thus when no voltage or a voltage below the threshold voltage is applied to the liquid crystal, the liquid crystal device is balanced such that the focal power of the device is approximately zero for all polarisations of light. When a voltage above the threshold is applied to the liquid crystal layers a bulk change in refractive index of the liquid contained therein occurs as described above such that the focal power of the liquid crystal layers reduces for all polarisations of light. This therefore results in the liquid crystal device 200 achieving an increased focal power for all polarisation of light due to the contribution of the positive focal power provided by the substrates and the focal power provided by the two liquid crystal layers. Although the device 200 has been described as a 'negatively' balanced optical system, it may also be implemented as an unbalanced system where the magnitude of the focal power provided by the substrates and the liquid crystal lenses is not equal, depending on the vision correction required by the wearer or end user. Furthermore, the substrates and liquid crystals may also be configured to provide a negative and positive focal power respectively in the off-state, which may be of use for the correction of conditions such as myopia or in applications outside vision correction. In order to configure the liquid crystal device 200 to be polarisation independent, the alignment and the electric field dependence of the liquid crystal directors in the two cavities must be designed carefully. In the simplest configuration, the alignment surfaces of the cavities are prepared so that the directors of the liquid crystal in the two cavities are largely in the cavity plane and orthogonal in each of the cavities. In such cases, the nematic liquid crystal with a positive dielectric anisotropy $\Delta\varepsilon$ is chosen. Consequently, without a voltage applied or with a voltage below the switching threshold, polarised light experiences a refractive index of $n_e$ in one liquid crystal lens, and $n_o$ in the other. Upon application of a voltage exceeding the threshold voltage to the liquid crystal, light transmitted through the device experiences a much lower refractive index. For sufficiently high voltages, the refractive index of each cavity is approximately $n_o$ in both liquid crystal lens, reducing the optical power of the liquid crystal lenses, and hence providing a positive optical power in the system when the substrates are configured to provide a positive focal power. In some example embodiments, as for the liquid crystal device described with reference to FIG. 1, a liquid crystal with a twisted geometry could be used to form the liquid crystal layer of the polarisation independent liquid crystal device. For example, the rubbing directions in each cavity are orthogonal to each other in each cavity, so that the preferred alignment directions at surfaces 203 and 201 are parallel to each other, but orthogonal to surfaces 202 and 204. Thus, the director profile undergoes a 90° twist from one surface to the other, and the twist in the cavity is orthogonal to that of its neighbouring cavity. Use of such a twisted liquid crystal may reduce the polarisation dependency of the liquid crystal in each cavity of the device and therefore may improve the performance of the liquid device when non-polarised light is to be focussed. In this example, the liquid crystal alignment for each cavity is made uniform by including a chiral dopant mixed into the positive $\Delta\varepsilon$ nematic liquid crystal. This dopant should ensure that there is a slight natural twist of the nematic director, usually with a natural pitch of several hundred microns. The alignment directions of each cavity are designed so that the pre-tilt of the director matches the natural helical twist of the chiral nematic. This design can be further optimised by doping the liquid crystals in the two cavities 205 and 206 with dopants with opposite handedness. Together with the correct adjustments to the pre-tilt directions of the four surfaces, the device is arranged to give left-handed twist sense in one cavity and right-handed twist sense in the other. In this fashion, the off-axis components of the focussed light will also be compensated throughout the transition between the two limiting voltages. Note, this is an example of the current invention wherein the liquid crystal material differs in the two cavities of the lens.

In another example of the invention, the surfaces of the cavities are treated to give homeotropic alignment, where the preferred alignment direction is normal to the local surface plane and the director configuration forms a vertically aligned nematic or VAN. With such a design, a nematic material with a negative $\Delta\varepsilon$ is chosen, wherein the director is induced to lie towards the plane of the cavity on application of the applied voltage. In such instances, the director will tilt into the plane of the cell with a random orientation. This is satisfactory for the single cavity lenses such as those exemplified in figure one. However, for polarisation independent lenses such as those shown in FIG. 2, it is important to ensure that the directors of the two cavities are orthogonal. This is done, for example, using a homeotropic alignment agent that leads to a very slight tilt away from normal (for example 89.5°) when rubbed. For such designs, the lenses can be constructed to give orthogonal orientations, either planar or twisted, by orthogonal rubbing as in the previous examples.

The inventors have found that following the teaching of the current invention and using the VAN design of the previous example, it is only the area of each cavity with the lowest spacing, and only one of the surfaces that needs to be oriented deliberately. Above the threshold voltage, the area of the cavity with the lowest spacing switches first. Because this area has pre-alignment, the director orients in the desired direction. Areas away from this region that would otherwise switch in a random direction are forced to align in the desired direction to minimise the elastic distortion of the cavity. This arrangement greatly simplifies the construction of the device, thereby increasing manufacturing yield and lowering device costs. For example, each cavity has one concave substrate and one convex substrate arranged so that, when spaced apart appropriately, the liquid crystal filled cavity has the lowest spacing at the centre (i.e. the axis of cylindrical symmetry) and increases spacing gradually towards the edge of the cavity. The inventors have found that satisfactory alignment of the director results from rubbing the central part of the lens only, with only a single surface being required to break the random symmetry of the homeotropic alignment. This means that the rubbing step can be done on the convex side of each cavity only (206, 208) thereby allowing conventional rubbing methods designed for flat surfaces to be employed (rather than the novel methods described later in this invention). Furthermore, this means that the central substrate 202 needs only a single rubbing. This also simplifies processing, since the central substrate is readily coated with the homeotropic agent on the opposite side without disturbing the sensitive rubbed surface defined previously.

These advantages are also applicable to the hybrid aligned nematic (HAN) geometry, wherein one surface is a rubbed planar surface arranged in orthogonal directions in the two cavities, and the other internal surfaces of the cavities are (unrubbed) homeotropic. In this instance, the inventors found that the whole of the planar surface needed rubbing to achieve uniform alignment (due to surface memory effects at the surface resulting from the filling process). However, the simpler processing afforded from the homeotropic surfaces proved advantageous.

Throughout the text of the invention the word rubbing is used as an example method for defining an alignment direction and the associated pre-tilt. Those skilled in the art will recognise that there are various alignment methods that could equally be applied, including photo-alignment, evaporation of inorganic layers, e-beam or ion beam etching and micro-groove alignment.

FIGS. 1 and 2 and the accompanying description set out the structure of the liquid crystal devices which may form the optically active components of polarisation dependent and independent liquid crystal contact lenses, respectively. However, in practice it is likely that further additional elements may be required if the devices are to be worn as contact lenses. Methods of placing the device on the eye may include direct placement of a self-contained rigid device constructed from PMMA or RGP materials upon the cornea, or implementation of the device into a hydrogel outer structure. A first of these additions is the placement of the devices 100 and 200 into a soft lens. A technique known as piggybacking may provide a solution to this requirement, and is currently used to attach existing rigid gas permeable (RGP) lenses to soft lenses. A depression is cut into a soft contact lens, and the RGP lens is placed in this region, with a combination surface tension and mechanical forces keeping the lens in place. In most examples the liquid crystal device requires a rigid structure to ensure liquid crystal alignment and the ability to provide electrode contacts and hence PMMA is a suitable material. Piggybacking the solid liquid crystal device on top of a soft contact lens made of hydrogel for example will give the comfort benefits associated with soft lenses while allowing the rigid substrates to provide the foundation for the electronic components. The operation of the electrical elements in the switching cavities, and any associated electronics comprising the lens device, need to be kept free from excessive moisture which would otherwise degrade performance. The piggyback design also simplifies manufacture by minimising the number of different designs required. That is, the shape of the outer surfaces of the hydrogel lenses into which the solid lens is mounted are all that differs for the individual user. Despite these advantages, however, some issues may remain, such as the total thickness of the device and how to mount electrical connections on a curved surface matching an anterior corneal curvature. Other methods of implementation, such as moulding the hydrogel around the liquid crystal element can be used to form a soft contact lens from the optical devices described. Finally methods of directly printing, spin-coating and dip-coating rigid devices with hydrogel structures may also be used for the provision of a hydrogel coating to improve comfort and aid placement in the eye (Wang et al. Nano Letters, 2014).

The manufacture and testing of liquid crystal contact lenses may be a complex process and therefore it may be advantageous to use example embodiments of the present disclosure which are designed to aid testing and manufacture. FIGS. 3 and 4 provide schematic designs diagrams of example substrates for liquid crystal devices which may for example be used for testing of substrates and liquid crystal layers, adhesion techniques, and techniques to power the electrodes etc. FIGS. 3 and 4 also provide example dimensions in micrometers ($\mu m$) of the liquid crystal devices but these dimensions should not be construed as limiting the shape, dimensions or structure of the substrates or liquid crystal devices as these may be adapted to suit the application to a user's eye and the focal requirements of the user. The shape of the portions of substrates indicated by 302 and 402 in FIGS. 3 and 4 approximately correspond to that of FIGS. 1 and 2, respectively. However, there are also flat portions 301 and 401 at the edges of the substrates in order to assist with testing of the liquid crystal devices and aid the mating of the substrates to each other to form the liquid crystal cavities, the thickness of which are indicated by 304 and 403. The flat portions may also aid the attachment of wires etc. in order to power the electrodes which may be formed on the surfaces of the substrates. In practice, these areas may be cut from the device after testing to then proceed to the end parts of the manufacturing process. The example embodiments described with reference to FIGS. 1 and 2 may have non-optical regions outside of the light focussing area of the devices as opposed to the flat portions of FIGS. 3 and 4. These non-optical regions may be located upon the cornea of a user and used for the attachment of electronic components such as wires, power sources and control elements.

As previously described, in order to change the refractive index of the liquid crystal contained within the cavities a voltage above a threshold voltage is required to be applied across the liquid crystal. Liquid crystal has been extensively used in applications such as televisions and watches and therefore the behaviour of liquid crystal is documented well and shall not be described in detail here. The bulk change in refractive index which enables the operation of the example embodiments described with reference to FIGS. 1 and 2 occurs when a voltage is applied across the liquid crystal. In particular, a voltage over a certain threshold is required if a transition between the refractive indexes of $n_e$ and $n_o$ is to be achieved. Due to possible application of the devices 100 and 200 to contact lenses it is advantageous if the threshold voltage is relatively low in order to simplify the generation of the voltage and ensure the safety of the device when placed in a user's eye. The main factors that determine the threshold voltage are the type of liquid crystal in the liquid crystal layer (for example, the elastic constants $K_{ii}$ and dielectric anisotropy $\Delta \varepsilon$ for a nematic liquid crystal material) and any dielectric substances in between the electrodes and the liquid crystal layer. Furthermore, it may also be advantageous to keep the thickness of the liquid crystal layer as low as possible in order to decrease the response time of the liquid crystal layer for transitioning between $n_e$ and $n_o$. Consequently, these factors as well as the required change in refractive index are required to be taken into account when designing a liquid crystal device as illustrated in FIGS. 1 and 2. The birefringence of a liquid crystal influences the possible change in refractive index when a voltage is applied, with liquid crystals with a higher birefringence resulting in a large change in refractive index in a liquid crystal layer with a constant geometry. Consequently, it may also be advantageous to have a relatively thin liquid crystal layer formed from a high birefringence liquid crystal so further improvements in the response times of the liquid crystal layers and thus the liquid crystal device can be obtained.

Figure 5:
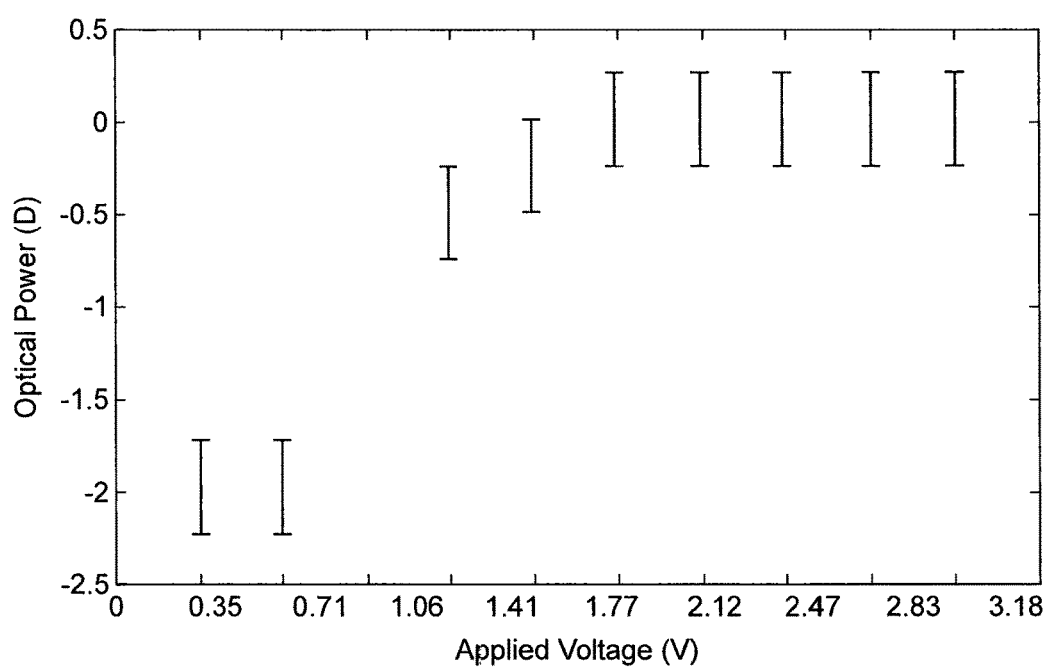
FIG. 5 provides a plot of focal power P of a liquid crystal device versus applied voltage found experimentally in a lens designed in accordance with an example embodiment of the present invention.

FIG. 5 provides a graph of focal power against an applied 10 kHz AC voltage for a liquid crystal device formed in accordance with example embodiments described with reference to FIG. 1 and FIG. 3. The liquid crystal is 5CB and the liquid crystal layer has a central thickness of 50 μm increasing to 75 um at the edge of the active aperture. This design is required for nematic liquid crystals with positive $\Delta\epsilon$ switching towards vertical alignment (where the refractive index of the liquid crystal cavity is at or close to $n_o$. The results of FIG. 5 are taken for a sample with planar alignment on both internal surfaces of the cavity, each aligned parallel to the other. As can be seen, the focal power of the liquid crystal lens switches between a focusing power P approximately −2 diopters to 0 diopters with a voltage of approximately $1.77V_{rms}$ sufficient to achieve a focal power of 0 diopters. That is the change in focussing power ΔP is +2.0 Diopters. The results of this graph illustrates that, when in combination with substrates with an increased focal power, the liquid crystal lens will enable the liquid crystal device to switch between approximately 0 and 2 diopters at threshold voltage of less than $2V_{rms}$. This performance therefore shows the capabilities of example embodiments to function as the optically active element of a contact lens for the correction of presbyopia. Although the results of FIG. 5 are suitable for a negatively balanced optical device, by altering $n_e$ and $n_o$ of the liquid crystal layer or by modifying the focal power of the substrates, the device may be configured to switch between approximately zero and +2 diopters (ΔP=+2). In addition, changing the top radius of curvature of the substrates 304 and 403, corresponding to surfaces 305 and 405 enables a switch between any resting focal power corresponding to the off state of the device and an addition of +2 dioptres when activated for example. Typically resting focal powers may correspond to distance vision corrections and the device includes an additional power correction when activated to provide near vision correction. Furthermore, by selection of appropriate liquid crystal, liquid crystal layer thickness, geometry and applied voltage, an optically active liquid crystal device may be formed which can switch between a wide range of both positive and negative focal powers. In terms of applied voltages, in some example embodiments the magnitude of the applied voltage may be between 0V and 50Vrms. However, as mentioned above it may be advantageous for the applied voltage to be relatively low, such as between $0V_{rms}$ and $10V_{rms}$, an preferably less than $5V_{rms}$ A ΔP of +2 is sufficient for the majority of presbyopes. However, lenses may be designed using higher Δn and/or higher differences in the radius of curvature for the cavity to produce ΔP>+2. For example, a lens designed to give ΔP>+3 may be used by a presbyope with a more typical requirement of ΔP=+2 by modulating the voltage applied to the cavity accordingly. However, for reasons outlined below, there may be compromises with this approach, such as slower response speed, and so it may be preferable to provide cavity designs for several ranges of performance.

Figure 6:
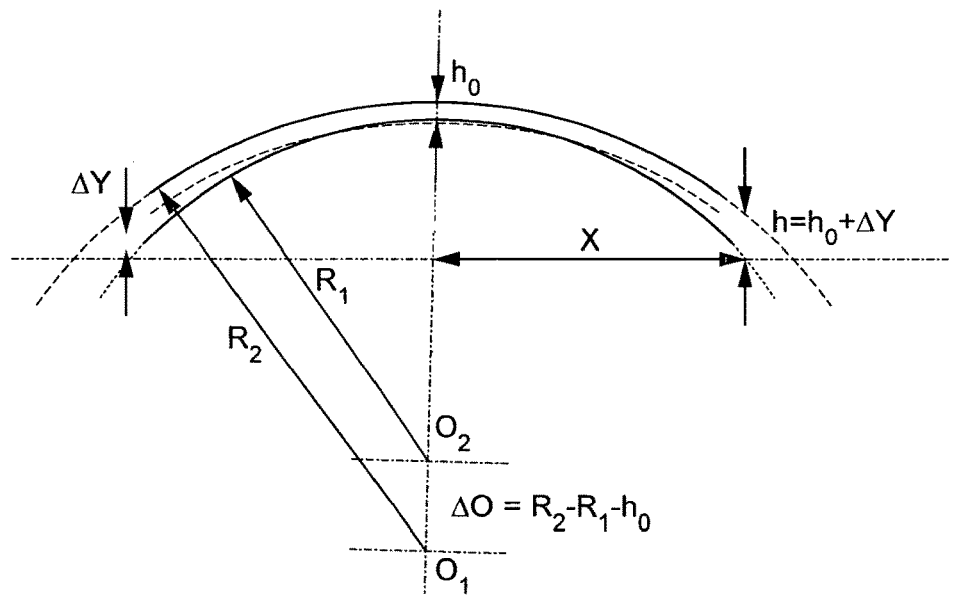
FIG. 6 provides a schematic diagram of an embodiment of the liquid crystal device in accordance with the present invention, wherein the positive change in focal power results for a material where the optic axis of the liquid crystal aligns parallel to the applied field.

Consider a contact lens designed according to the current invention for positive Δε, and using spherical lenses for simplicity. (In practice, other shapes may be included, for example for the correction of astigmatism). FIG. 6 shows a schematic of an example lens cross-section wherein the liquid crystal cavity is formed from a lower substrate of radius $R_1$ and upper substrate radius $R_2$ aligned to be coaxial with the lower substrate. (Note, as with FIGS. 1, 2, 3, 7, and 8, it is assumed that the eye is below the lens and that light is incident from above the lens). As for the other examples shown throughout, the cavity is formed from two convex surfaces of appropriate curvature. The thickness of the cavity is then related to the spacing at the centre of symmetry $h_0$ and the width of the aperture X. The lens equation gives the change in focusing power ΔP (in diopters D or $m^{-1}$) associated with a change in refractive index from $n_1$ to $n_2$ as:

$$\Delta P = (n_1 - n_2)\left(\frac{1}{R_1} - \frac{1}{R_2}\right) \quad (1)$$

To ensure positive ΔP then $n_1$ should be higher than $n_2$ with $R_1$ lower than $R_2$ or $n_1$ lower than $n_2$ with $R_1$ higher than $R_2$. Calamitic liquid crystals have a positive birefringence, Δn. If the cavity is designed with the electrodes on either surface so that the applied electric field is (approximately) parallel to the direction of optical transmission then a positive Δε material will align the director parallel to the field so that the refractive index tends towards the ordinary component $n_o$ with applied field: that is $n_2 \rightarrow n_o$. A positive ΔP then results from planar alignment such that $n_1 \approx n_e$ (for polarisation parallel to the director) and $R_1 < R_2$. In this instance, the LC cavity has a minimum thickness $h_0$ at the centre of the coaxial surfaces and become thicker towards the outer edge of the cavity (or at least the outer edge of the active region of the operating aperture) until it reaches a spacing of h at the edge of the active part of the cavity. The difference in spacing is given by ΔY, and the lens will have a focussing power P providing that the refractive index experienced by light traversing the cavity differs from the material used to form the substrate, and that Δy is finite and not zero.

For an example arrangement where the cavities are formed from spherical cross-sections with curvature $R_1$ and $R_2$ as shown in FIG. 6, the ΔY is given by:

$$\Delta Y = R_1 - R_2 - \sqrt{R_1^2 - X^2} + \sqrt{R_2^2 - X^2} \quad (2)$$

where X is the width of the active aperture. Typically, $R_1$ will be close to the anterior radius of the cornea, which is typically about 7.8 mm. The active aperture is designed to cover the pupil of the eye, and so X is typically 2.5 mm. Because $X \ll R_1$ then ΔY is a reasonable approximation to the change in cell spacing of the liquid crystal from the centre of the cavity to the outer edge of the switching region. Usually, the central part of the cavity will also be spaced at a distance $h_0$ and the cells aligned coaxially, so that the maximum spacing h is:

$$h = h_0 + \Delta Y \quad (3)$$

Figure 7:
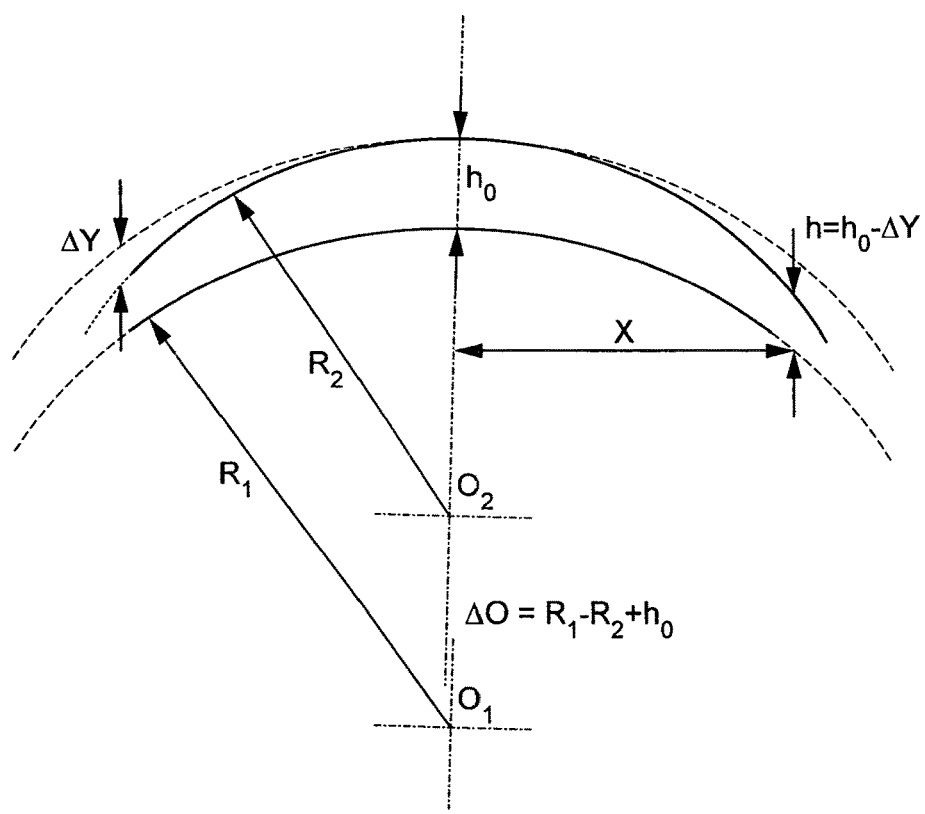
FIG. 7 provides a schematic diagram of an embodiment of the liquid crystal device in accordance with the present invention, wherein the positive change in focal power results for a material where the optic axis of the liquid crystal aligns perpendicular to the applied field.

An alternative arrangement is shown in FIG. 7. Here the system is chosen so that the applied field causes a reduction in the refractive index. An example of such a system is a calamitic nematic liquid crystal with a negative Δε arranged to form a vertical aligned nematic (VAN) with homeotropic alignment on both internal surfaces of the cavity. With a negative Δε material the applied field tends to induce reorientation of the director to be perpendicular to the field direction, and hence the refractive index of the cavity increases towards the limit of $n_2 \approx n_e$. For a VAN arrangement the initial cavity refractive index $n_1 \approx n_o$. Equation (1) shows that ΔP is positive if for $R_1 > R_2$ and the cavity has a wider spacing at the coaxial centre of the aperture. In this instance, h is the minimum thickness of the cavity, and given by:

$$h = h_0 - \Delta Y \quad (4)$$

Figure 8:
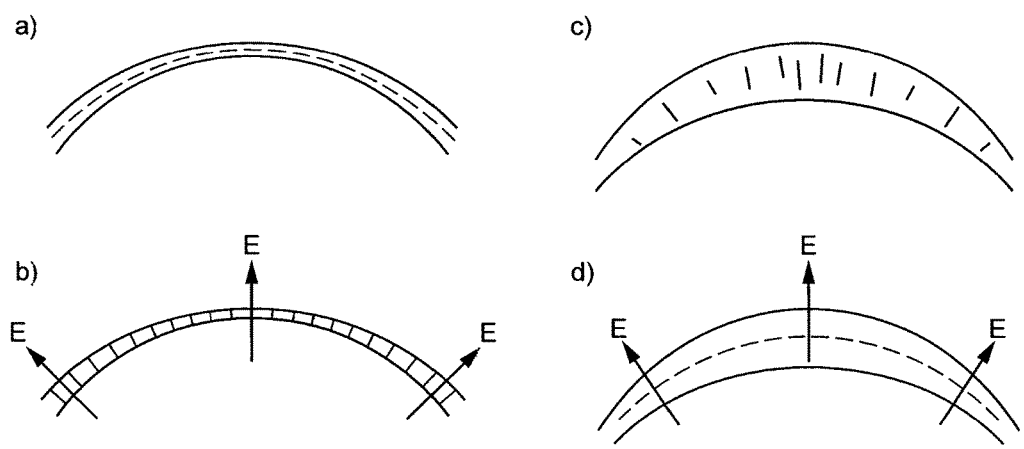
FIG. 8 provides a schematic diagrams of an embodiment of the liquid crystal device in accordance with the present invention, wherein the liquid crystal has a positive dielectric anisotropy and is arranged to be planar aligned in the cavity a) until an applied field aligns the liquid crystal director in the direction normal to the cavity surfaces b). Also shown is the case for a negative dielectric anisotropic nematic material, wherein the quiescent state is homeotropically aligned c), and the director aligns perpendicular to the applied field.

FIG. 8 summarises the preferred embodiments for a nematic liquid crystal with a positive Δε, FIGS. 8a) and b), and for nematic liquid crystals with negative Δε, FIGS. 8 c) and d). These examples represent the situation for typical calamitic nematic liquid crystals. Other embodiments will be clear for those skilled in the art. For example, with discotic liquid crystals (for example the $N_D$ phase) the birefringence Δn is negative and the alignment conditions are reversed accordingly. For ferroelectric liquid crystals, the director orients perpendicular to the applied field (given the constraints added by the smectic layer structure) but with an orientation dependent on the field polarity.

Figure 9:
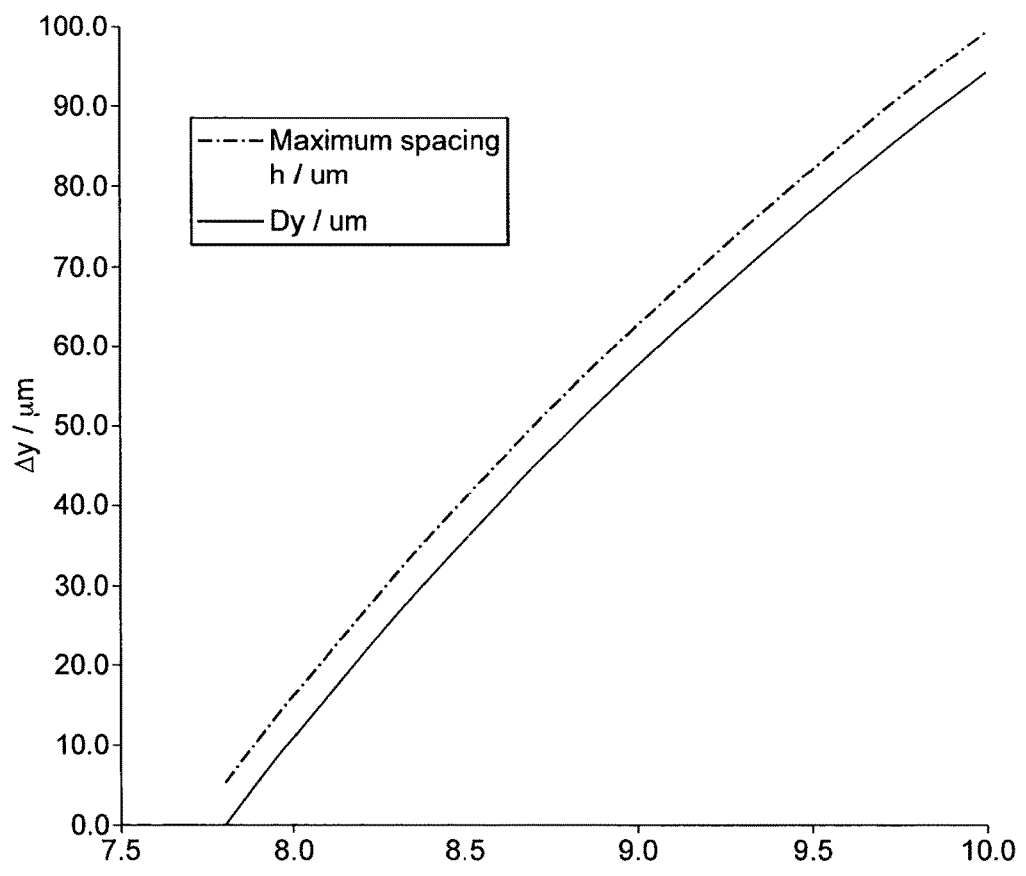
FIG. 9 is a plot of an example for the change in spacing of the liquid crystal cavity across a 5 mm diameter active aperture according to the present invention.

Typically, the internal radius of the cavity $R_1$ will follow the anterior curvature of the eye, with a spherical radius of curvature of about 7.8 mm. For a positive LC cavity, $R_2 > R_1$ as shown in FIG. 9, where the change in cell spacing ΔY is plotted as a function of the external radius of the cavity $R_2$. Also shown is an example of the maximum cell spacing, h, where $h_0$ was set to 5 μm as a typical example. The inventors have found that the quality of the liquid crystal alignment is somewhat degraded if the liquid crystal cavity spacing exceeds 100 μm, and indeed the best lens quality was found for positive lenses with the maximum spacing h less than 50 μm. FIG. 9 then shows that a preferred embodiment of the lens for a positive lens has an outer radius of curvature that is less than 10 mm, preferably less than 9 mm. Furthermore, the inventors have found that good quality filling and alignment only occurred with lenses spaced by a minimum of 2 μm, preferably 4 μm. This was due to the tolerances of alignment for the at least two coaxial substrates, but also to help prevent electrical shorts from occurring across the cavity. Hence, the inventors propose the following design rule for positive lenses according to the current invention:

$$R_1 + 2 \; \mu m < R_2 < 1.28 R_1 \quad (5)$$

Figure 10:
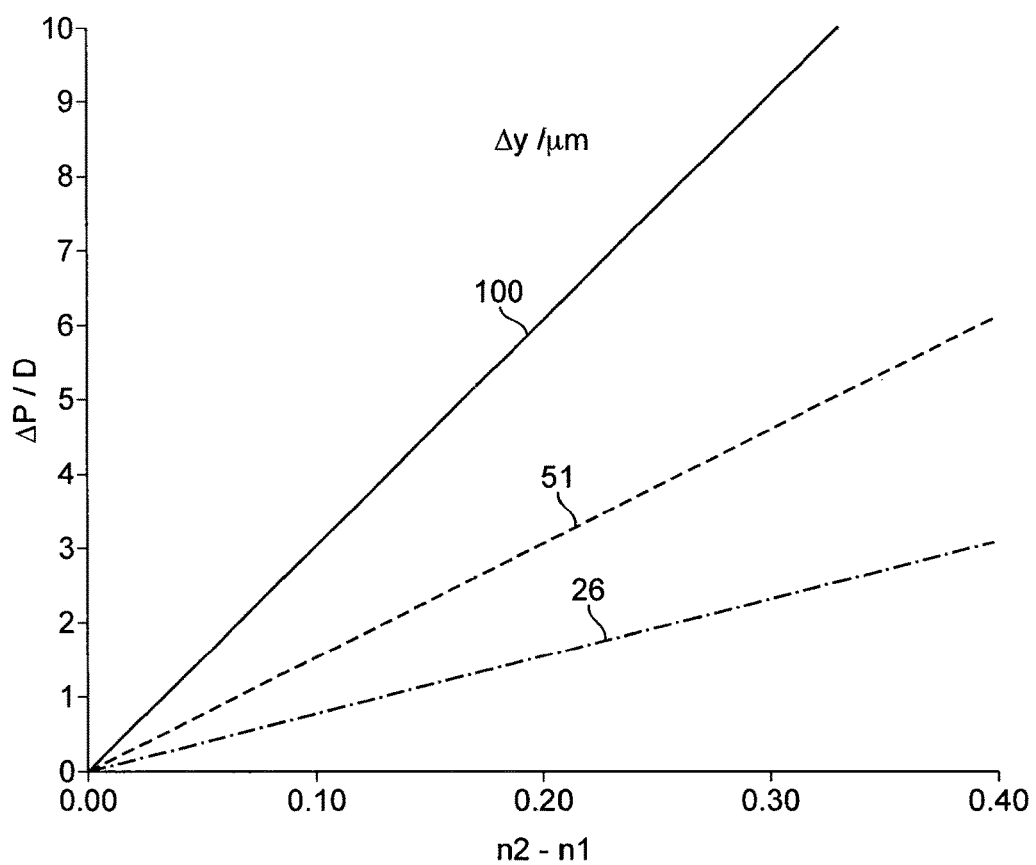
FIG. 10 is the change in optical power for cavities with different curvatures plotted as a function of the difference in refractive index between the on ($n_1$) and the off ($n_2$) states for different changes of cavity spacing ($\Delta y$).

Equation 5 provides a design rule for an example positive lens according to the current invention. However, the performance of the lens is largely dependent on the change in focusing power ΔP (measured in dioptres D) caused by inducing different refractive index components in the direction of optical transmission of the lens. FIG. 10 shows the solution to equation (1) for $R_1 = 7.8$ mm and X=2.5 mm as a function of the change in refractive index $n_2 - n_1$. Clearly, the change in focal power requires that both $n_2 - n_1$ and ΔY are finite: greater changes of DP occur for higher $n_2 - n_1$ and/or ΔY. Quite large changes in focal power are possible even using the design rule of equation (5). For example, ΔP=8 for $n_2 - n_1 = 0.25$ and ΔY=100 μm.

Figure 11:
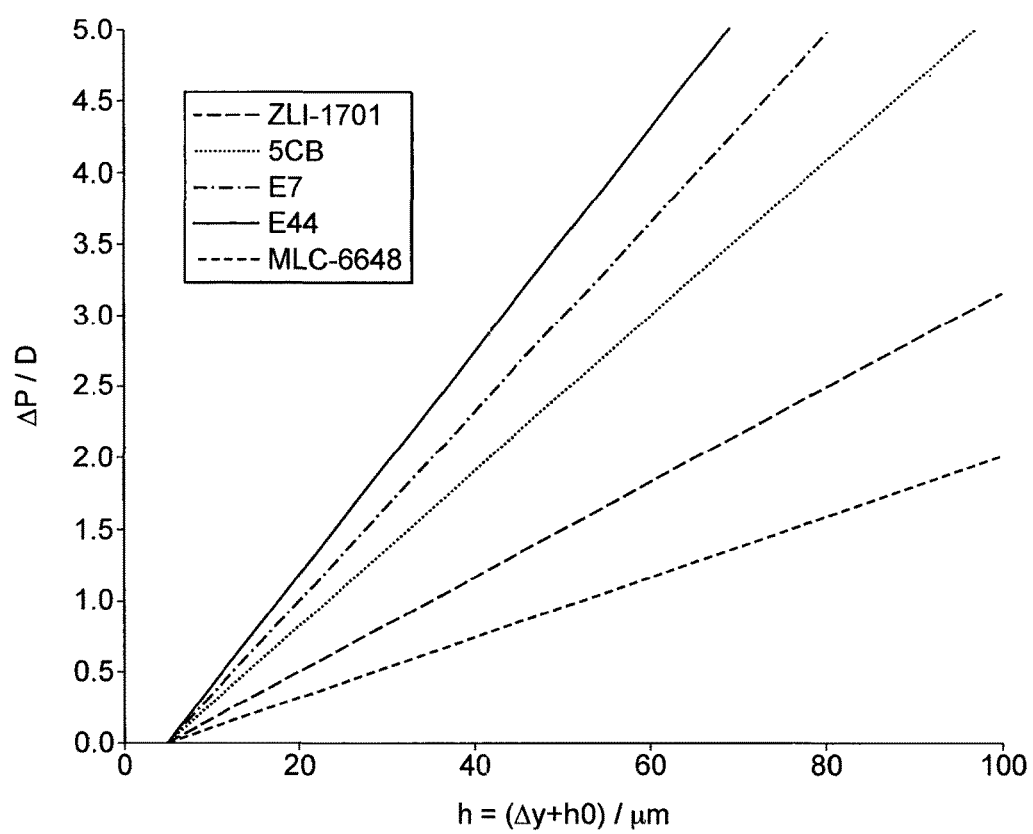
FIG. 11 is a plot of the change in optical focussing power $\Delta P$ versus maximum cavity spacing h for a selection of different positive nematic mixtures.

The change in focus ΔP for several typical positive Δε nematic materials with different $R_2$, and hence maximum spacing h, is shown in FIG. 11. These theoretical points were calculated by assuming the electric voltage is sufficient to fully switch the director to $n_2 = n_o$ from $n_1 = n_e$ and that a minimum spacing of the lens $h_0 = 5$ μm was chosen.

Figure 12:
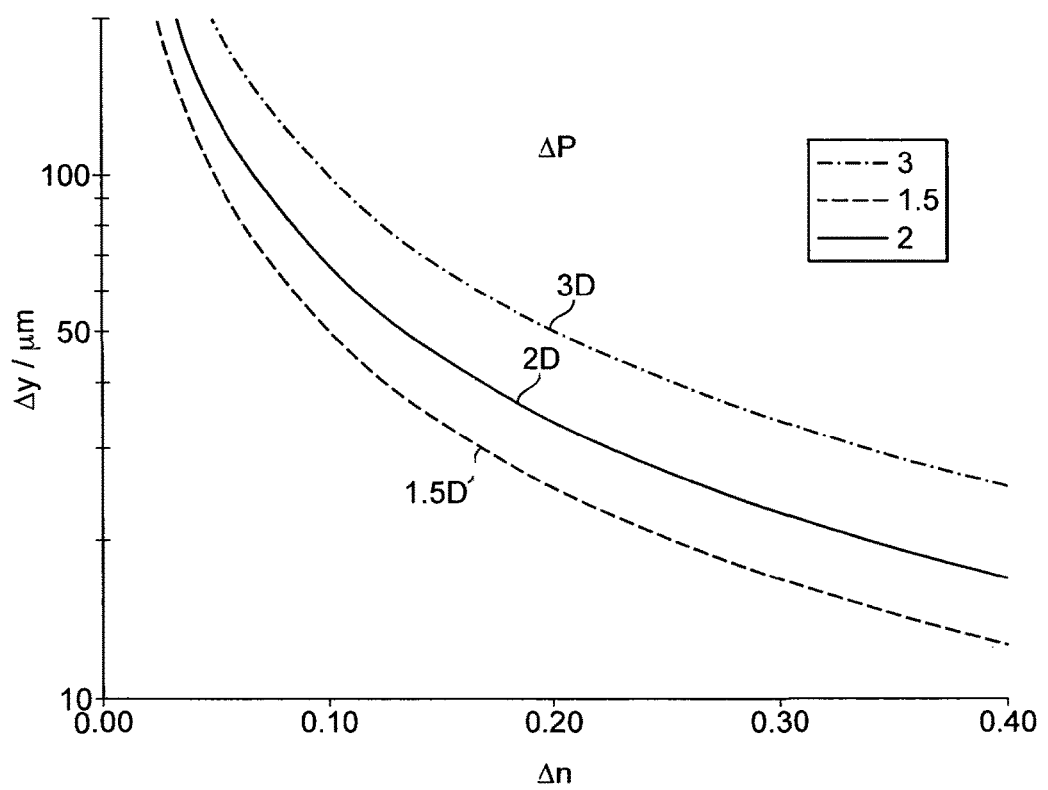
FIG. 12 shows the maximum difference in cavity spacing change $\Delta y$ that is required when targeting focusing powers of $\Delta P=1.5$ D, 2.0 D and 3 D as a function of the change in refractive index between switched and un-switched states.

The target ΔP is 2.0 for the majority of presbyopic end-users of a contact lens designed according to the current invention. FIG. 12 shows that the birefringence of the liquid crystal required to achieve this change in focal power for cavities that satisfy the design rule given by equation (5) must be greater than Δn=0.1 and preferably greater than Δn=0.15. For exceptional cases with a target ΔP=3.0, then Δn>0.22 is preferred.

Figure 13:
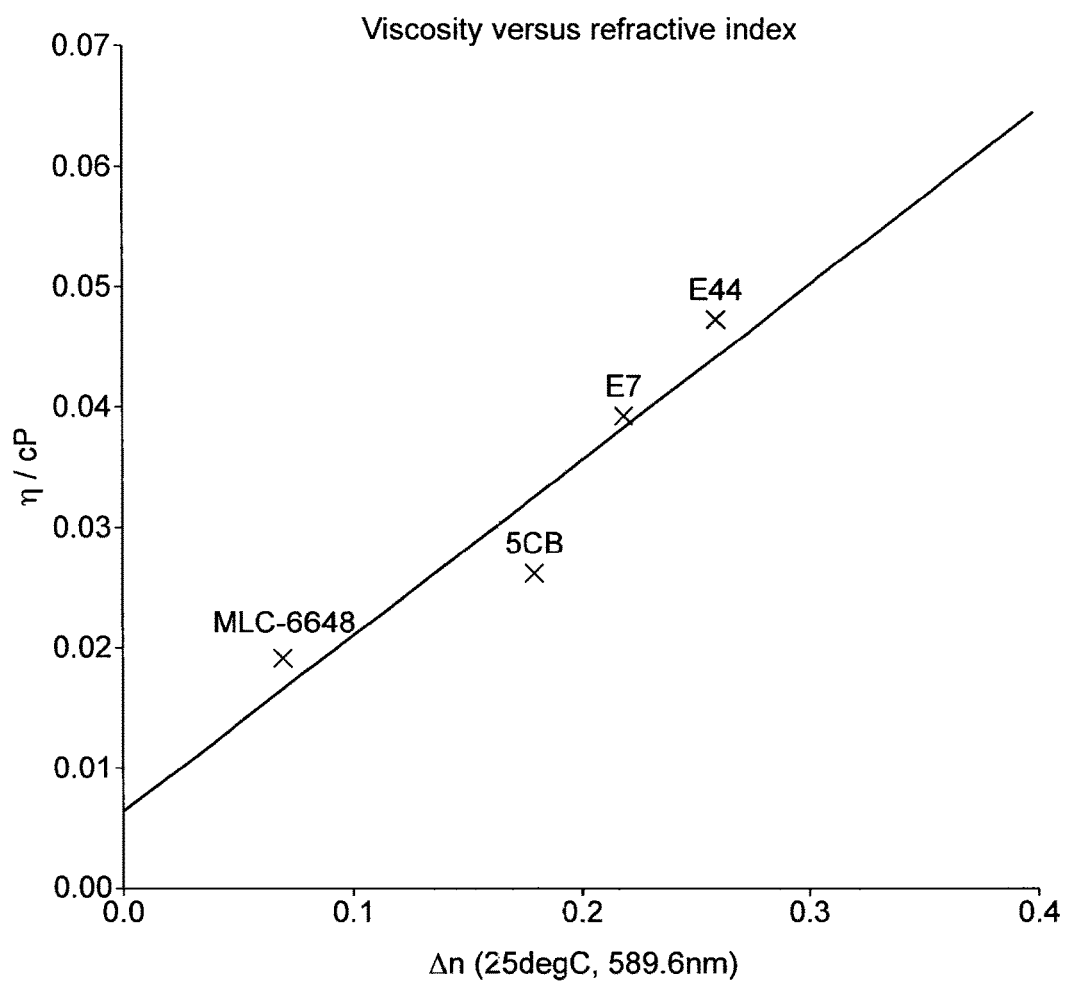
FIG. 13 shows an approximate relationship between nematic viscosity (in cP) and birefringence.
Figure 14:
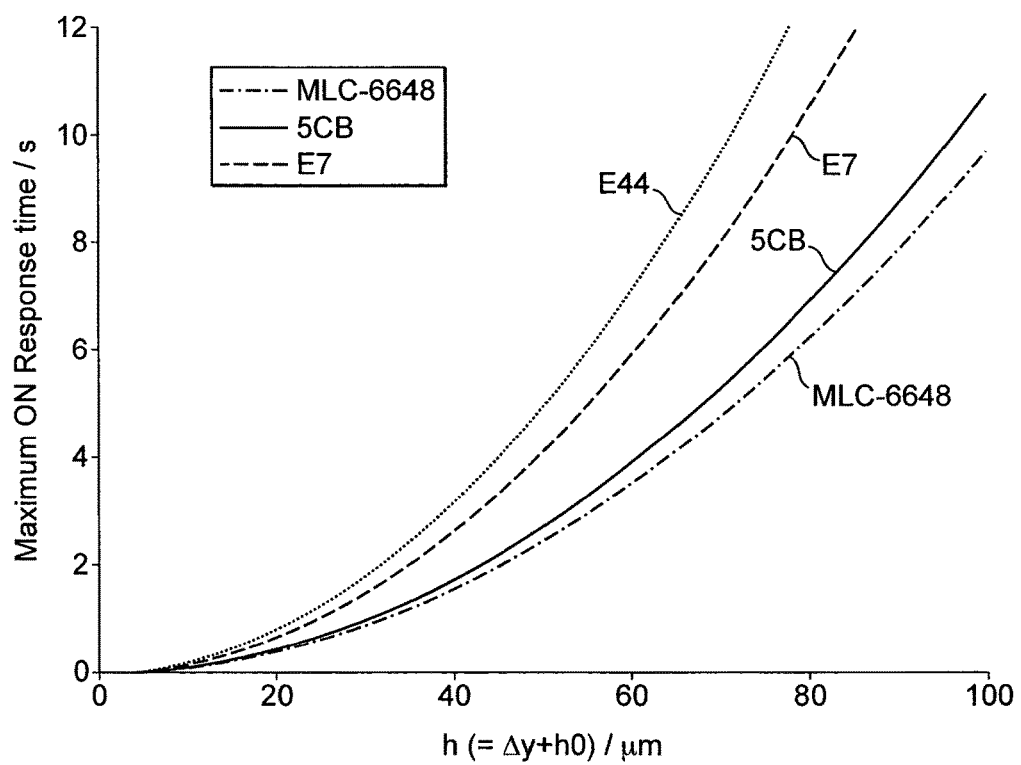
FIG. 14 illustrates the theoretical prediction for the on-time for a series of positive $\Delta \varepsilon$ nematic mixtures versus the maximum cavity spacing h for a typical lens designed according to the current invention.
Figure 15:
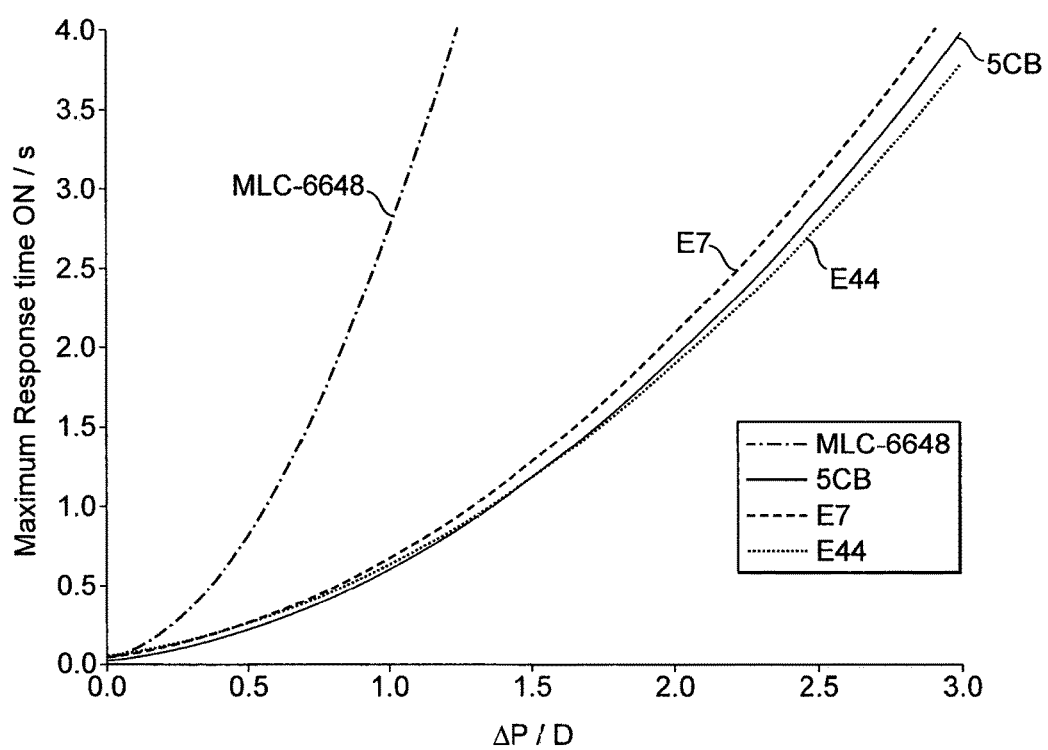
FIG. 15 shows the theoretical prediction for the on-time for a series of positive $\Delta\varepsilon$ nematic mixtures versus focal power $\Delta P$ for a typical lens designed according to the current invention.

FIG. 14 shows the maximum response time $\tau_{on}$ versus maximum cavity spacing h of several positive Δε nematic liquid crystals to a 5V signal for lenses with $h_0 = 5$ um, calculated using the standard Jakeman-Raynes equation for nematic switching:

$$\tau_{on} = \frac{\gamma_1 h^2}{(V^2 - V_c^2)} \quad (6)$$

where $\gamma_1$ is the rotational viscosity and Vc is the switching threshold voltage. Clearly, the response time can become quite high for the more viscous of the mixtures such as E44. However, the birefringence of E44 is much higher than the other example mixtures, as shown in FIG. 13. Thus, it is shown in FIG. 15 that, despite having an inherently higher viscosity, it is preferable to use the higher birefringence materials to obtain stronger change in focal power. This is because the higher birefringence mixtures operate with a lower h, and the $h^2$ dependence for the response time in equation (6) more than compensates the increased viscosity.

Figure 16:
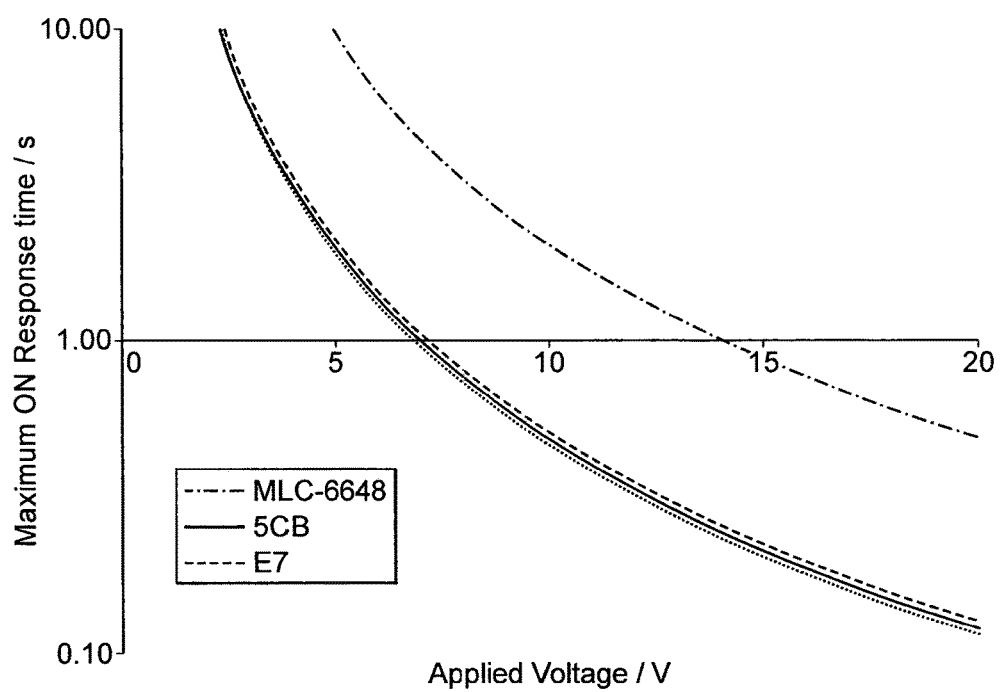
FIG. 16 provides a plot of the theoretical voltage dependence of the on-time for a series of positive $\Delta\varepsilon$ nematic mixtures used for an example lens designed according to the current invention such that the maximum focusing power $\Delta P$ is 2.

Applying 5V, as in FIGS. 14 and 15 still leads to a relatively slow response time. However, the voltage dependence of the response time required to achieve the target level of ΔP=+2 is shown in FIG. 16. This shows that response times below 200 ms are readily achieved with 15V applied, provided suitable nematic materials are chosen for the design. Note, as with the previous figures, R1=7.8 mm, X=2.5 mm and $h_0 = 5$ μm.

Figure 17:
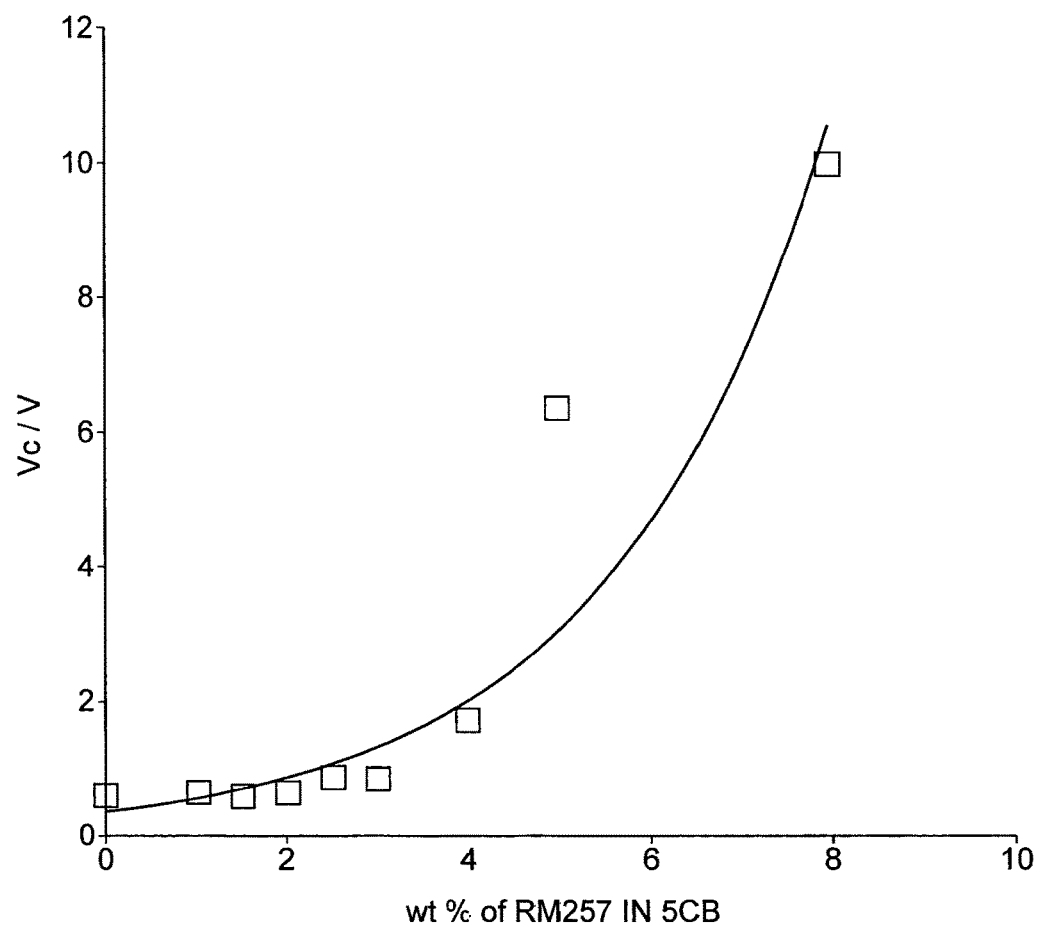
FIG. 17 provides a plot of experimental results for the room temperature (27° C.) switching threshold voltage Vc for a series of equivalent lenses designed according the current invention filled with positive nematic mixtures (5CB) with different percentages of monomer forming a UV cured polymer network according to one embodiment of the current invention.
Figure 18:
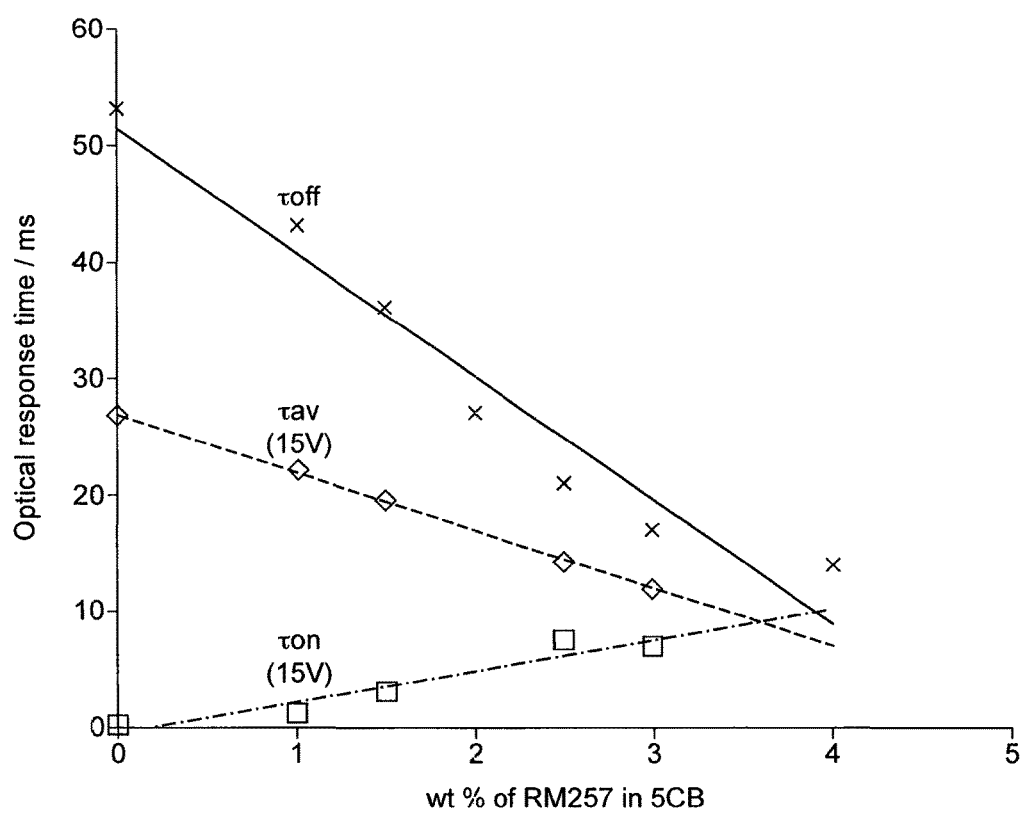
FIG. 18 shows the rise (ton), fall (toff) and average (tav) response times for a 15V applied field as a function of the weight percentage of the monomer used to form the polymer network in the positive nematic according of one embodiment of the current invention.

Polymer stabilised liquid crystals may provide faster switching times via a polymer network within the liquid crystal layer. This can be induced by dispersing a monomer within a liquid crystal material (typically less than 5%), which is then polymerised via UV light to form a network after placement in a device via cross linking. A series of lens were constructed with $h_0 = 2$ μm and ΔY=7 μm. The cells were filled with the positive nematic compound 5CB into which varying weight percentages of the reactive mesogenic monomer RM257 were added and polymerised with 264 nm UV to form the network. All of the lenses gave ΔP between 0.4 and 0.6. FIG. 17 shows the increase in the threshold voltage that occurred with increasing concentration of the monomer, and hence higher density of the polymer network. However, if a sufficiently high voltage to counteract this increase is used, then a clear reduction in the average response time is possible, as shown in FIG. 18. For example, using 3% by weight of the polymer gave a response time improvement by over a factor of 2.

Another set of materials which could be used to decrease switching times are dual-frequency liquid crystals. These materials are able to be switched on and off by application of different frequency voltages, corresponding to planar and homeotropic alignment driven by the switching frequency. Dual-frequency materials hence have the ability to remove the slow relaxation time of some liquid crystals.

Several alternative liquid crystals may be used for the liquid crystal lens, element or layer, to provide polarization independent correction with a single liquid crystal layer. For example, the Kerr effect based optically isotropic change in refractive index of blue phase liquid crystals and the optically isotropic change in refractive index of the dark conglomerate phase of certain bent core liquid crystals may be used for switching the liquid crystal device with a single liquid crystal cavity. Polymer dispersed liquid crystals use similar materials to polymer stabilised liquid crystals, with a greater concentration of polymer to liquid crystal in order form liquid crystal areas within a polymer matrix. Typical concentration of monomers in the material is 70%, with photo-polymerisation providing the required dispersion of liquid crystal droplets in the polymer. In the electrically inactive state, the liquid crystal is unordered in the droplets, with an average refractive index observed. Upon voltage application, the local director of the drops orientates with the electric field and $n_e$ is observed. This principle has been used in diffractive based lenses, although the high levels of scattering may affect the optical quality of a solid lens device such as those of the present disclosure. Blue phase liquid crystals do not require alignment, are polarization independent and have an electrically switchable refractive index, making them suitable for liquid crystal lens use. However, issues may arise from the temperature range and high operating voltages.

Other liquid crystal modes of operation can be employed for lens use to provide alternative optical switching processes, some of which may be polarization independent. Some examples include the following:

1. Vertically aligned nematic (VAN) mode with negative dielectric anisotropic liquid crystal compounds using either rubbing technique or photo-alignment phenomenon with preferred tilt direction.
2. VAN mode with negative dielectric anisotropic chiral liquid crystal compounds can be used. If weakly chiral, VAN and TN states could be achieved.
3. Hybrid aligned nematic (HAN) mode where one substrate exhibits homeotropic alignment and other a homogeneous alignment. Both low and high tilt angles will be considered for optimisation.
4. HAN with either positive or negative dielectric anisotropic mixtures can be used.
5. Twisted nematic (TN) mode utilizes a 90 degree twisted alignment, where liquid crystal molecules are twisted in bulk and parallel to the substrates.
6. Similarly, weakly chiral nematics can be used in this geometry, so that the director twists from one surface to the other, as well as having splay and bend.
7. Cholesteric liquid crystals. Including blue phase and polymer stabilised blue phases;
8. Bistable display modes, including ferroelectric smectic C* liquid crystals, bistable surface modes such as ZBD. This may include the use of the device to view light of different polarizations depending upon the mode of operation.

In summary, in addition to the birefringence, other important parameters that can be varied are the ordinary and extraordinary refractive index ($n_e$ and $n_o$), the visco-elastic properties of the liquid crystal layer spacing, the and the optical mode. It should be observed that the temperature range for operation of the devices may be narrow, and centred around 37° C. Hence, nematic mixtures with low clearing points (eg $T_{NI}$ about 50° C.) can be designed, with potentially lower viscosities than standard nematics mixtures used for display applications.

Figure 19:
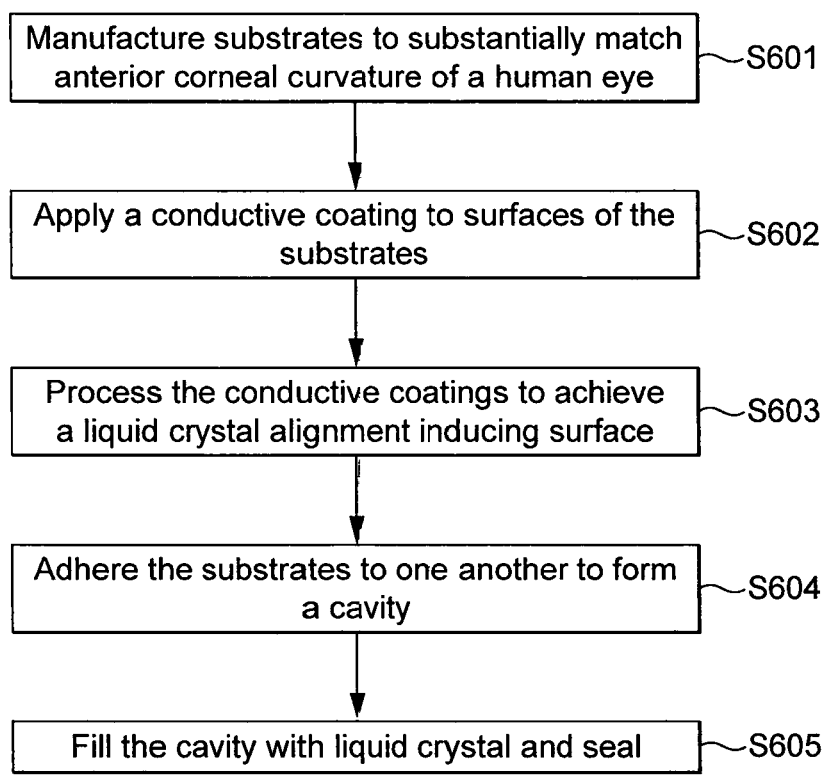
FIG. 19 provides a flow diagram of the manufacture of a liquid crystal device in accordance with an example embodiment of the present invention.

An obstacle to achieving a liquid crystal device as described above is the manufacturing of the device. Due to the new arrangement of components and the use of liquid crystal techniques in this application i.e. curved liquid crystal layers formed from cavities between curved substrates, a number of new techniques are required. FIG. 19 provides an example flow diagram of the major steps that may be required in the manufacture of the liquid crystal devices illustrated in FIGS. 1 and 2.

S601: Manufacture substrates to substantially match the shape of the anterior curvature of a human eye. For example, the substrates may be manufactured to match the corneal curvature of an intended wearer of contact lenses the substrates may be incorporated in.

S602: Apply a conductive coating to the surfaces of the substrates in order to form the electrodes of the liquid crystal layers.

S603: Process the conductive coating to achieve a liquid crystal alignment inducing surface.

S604: Adhere the substrates together to form a cavity.

S605: Fill the cavity with liquid crystal and seal.

Each of the above steps are described in more detail below with respect to a single cavity example embodiment as illustrated in FIGS. 1 and 3. All measurements, materials and processes provided by the description below are for example only and should not be construed as limiting the application of the described processes or the manufacturing process. For example, steps in the processes below may also be adapted or replaced by equivalent process (where they are available) which are known in the art, for example, the substrates may be moulded instead of lathed, different alignment techniques may be used and alternative measurement techniques may be used. Steps in the processes or the processes themselves may also be required to be adapted or replaced for the mass production of embodiments of the liquid crystal device previously described. Furthermore, steps in the processes may be used in isolation or steps skipped, for example as a result of using different materials or due to different end user requirements.

The steps included within S601 are described in Table 1 below where the process is repeated for each substrate.

TABLE 1

| Step | Description |
|---|---|
| 1 | Attach a PMMA blank to a 25 mm long block using dissolvable wax for adhesion. |
| 2 | Lathe the concave (back) surface using a contact lens lathe from the blank. |
| 3 | Measure the thickness of the central region of the blank using a micrometer. |
| 4 | Remove the blank from the block using mineral oil. |
| 5 | Attach the lathed the surface of the blank to a curved block with low temperature contact lens wax used for adhesion. |
| 6 | Lathe the convex (front) surface with a contact lens lathe using thickness measurements taken in Step 3 to calibrate the lathe. |
| 7 | Remove the finished substrate from the block using mineral oil. |

At step S602 a transparent conductive coating which forms the electrodes is applied to the surfaces of the substrates that form the walls of the cavity. Indium Tin Oxide (ITO) may be an appropriate substance to form the transparent conductive coating due to its common use in liquid crystal devices and previous application in plastic devices formed from PMMA. There are several techniques of depositing ITO upon a substrate, with the most common techniques for example consisting of e-beam evaporation and sputtering. Due to the nature of the substrates, i.e. PMMA with a low glass transition temperature, a cold ITO application process is required. ITO sputtering is capable of producing thin ITO films at low temperatures and is therefore suitable for use with the PMMA substrates. The general principle of sputtering is the bombardment of a target by energetic particles, with the ejected particles deposited upon the substrate. In order to control the flux of energetic particles striking the system, several alternative techniques may be used, for examples radio frequency magnetron sputtering, ion beam assisted deposition, chemical vapour deposition and direct current magnetron sputtering. A surface film may be achieved using a cold vacuum sputtering system, but using this process alone may lead to insufficient adhesion strength for the processes required for the construction of the devices, with slight mechanical agitations possibly removing the ITO film. To increase the adhesion strength an additional coating of a substance such as acrylic may be applied to promote adhesion whilst also serving to hard coat the substrates. An example substance that may be used is Polyacrylate, which consists of a blend of bi-functional and tri-functional acrylates curable using a high-energy UV output. In order to minimise optical distortion from the coating it may be advantageous to minimise the thickness of the coat, for example a thickness of 2 µm may be appropriate. After the coating, the substrates may be ITO coated using the cold vacuum spluttering.

At step 603 the transparent conductive coating that forms the electrodes is processed in order to achieve surfaces that induce liquid crystal alignment. As in other liquid crystal devices, the director representing the average orientation of the molecules within the liquid crystal are required to be surface aligned if the liquid crystal layer is to operate correctly. In flat liquid crystal devices homogeneous alignment of nematic liquid crystals is commonly achieved using an alignment layer of polymide that is rubbed to provide an alignment direction for the liquid crystal. Several materials are available for use as the alignment layer, with procedures generally involving spin coating the substrate with the polymide, with subsequent baking to cure the material and remove solvents. However, some low temperature laboratory polyimides require curing temperatures ranging from 140° C. to 250° C., which may be significantly higher than temperatures substrate materials suitable for use in the device can withstand. For example, the glass transition temperature of PMMA from which the substrates may be manufactured is approximately 93° C.

An example of a low temperature alignment agent suitable for use with PMMA is a PVA solution (Polyvinyl Alcohol), which can be baked at 60° C. to 120° C. depending upon the timescale. The mechanism of alignment action is believed to be chemisorption of PVA upon the substrate, resulting in polymer chains parallel to the substrate when cured. Mechanically rubbing the film in one direction then results in the polymer chains lining up in a uniform direction thus forming an alignment-inducing surface. PVA is a copolymer of vinyl alcohol and vinyl acetate, which is placed in a Deionised (DI) water solution until saturation. PVA alignments are generally weaker than polymide alignments, although the isotropy and strength of the anchoring can be modified by variation of the layer thickness and application of microgrooves. To form the PVA solution, a saturated solution is heated to 60° C. and stirred for approximately 1 hour, with the solution being left to cool afterwards, with subsequent filtering to remove any undissolved PVA. To achieve mechanical rubbing, planar substrates are usually placed upon a velvet surface and mechanically moved along the surface in one direction to provide alignment. However, such a method may be unsuitable for the curved surfaces of the previously described example embodiments, and a new technique for buffering the PMMA substrates may therefore be required. In the case of the curved surfaces of the PMMA substrates, the convex surface of the lower lens may be rubbed mechanically on a velvet surface to provide alignment, with a variety of motions required to buff the left, right and central region. The concave surface on the upper substrate requires a curved velvet surface. For example, a ball bearing with an appropriate curvature and covered in velvet may therefore be used to rub the surface. An example of a general procedure for alignment layer application for the PMMA substrates is described in the table below, where all measurements and materials are for example only and other procedure that are known in the art may be used to prepare the PVA solution or rub the substrates. It is also possible that mechanically rubbing the substrates without an alignment agent will also be successful in producing homogenous alignment. In one example a combination of PVA and substrate rubbing may be used to produce high quality alignments. Cleaning procedures prior to alignment agent application may also be required in order to remove any contaminants which can affect the device. Due to the nature of PMMA substrates, solvent use may not be possible because it can warp or destroy the substrates, therefore mineral oil may be more suitable for use as cleaning a cleaning solution. In order to remove any traces of mineral oil the substrate may be initially washed in an ultrasonic bath, using for example a 1:5 detergent:DI water solution for period of 30 minutes. It may then be necessary further rinse the substrates with deionised water adequate for detergent removal. A summary of the steps above are also given in Table 2 below.

A possible issue with alignment is the difficulty in providing uniform rubbing on the curved substrates. Photo-alignment may be an alternative option for curved substrates due to the lack of mechanical action required in its operation. It is also possible that alignment where the rubbing process is not necessary could be provided by forming grating structures on the substrates using processes such as photolithography, nano-imprint lithography, printing or embossing. Another example of un-rubbed alignment layers is the use of evaporated silicon oxide layers. Another alternative that may be used with previously described example embodiments uses homeotropic aligned materials and a liquid crystal material with negative dielectric anisotropy, in which the alignment layer does not require the rubbing process. Another method of providing planar alignment consists of the use of a focused laser beam (such as that provided by laser tweezers) to provide local heating of the liquid crystal in contact with the surface, inducing a bubble of isotropic liquid at the polymer surface. Scanning the laser in a particular direction leads to planar alignment along the scanning direction of the laser beam due to the effect of the meniscus of the isotropic bubble. By modification of the focus of the beam, different surfaces can be aligned in different directions that is advantageous for different geometries.

TABLE 2

| Step | Process |
| --- | --- |
| 1 | Make PVA solution with the following:<br>100 ml DI water with 1 g PVA |
| 2 | Magnetically stir and heat PVA solution at 60° C. for 60 minutes. |

TABLE 2-continued

| Step | Process |
| --- | --- |
| 3 | Allow the solution to cool for 60 minutes. |
| 4 | Filter the solution to remove any solid PVA from the saturated solution. |
| 5 | Rub the substrate using velvet surfaces |
| 6 | Treat the substrate with either<br>A) Spin coat the desired surface at 1000 rpm with PVA application via a pipette for 60 seconds<br>B) Place the total substrate in the PVA solution for 10 minutes to 30 minutes. |
| 7 | Remove excess PVA solution via a N2 stream. |
| 8 | Bake substrate at 60° C. for 60 minutes. |
| 9 | Rub the surface with a velvet surfaces with N2 stream to remove any debris |

Although the use of PVA as an alignment layer has been described above, this is an example of only one of a number of possible alignment materials and techniques that are well-known to those skilled in the art. For instance, it is possible to provide alignment without an alignment layer, for example by directly rubbing the PMMA substrates. Other alignment materials that can also be used to promote specific alignment, which may be planar, homeotropic or tilted depending on the material include other polymers such as polyimides which can be designed to be baked at appropriate temperatures, nylon, or surfactants or silane materials.

Figure 20:
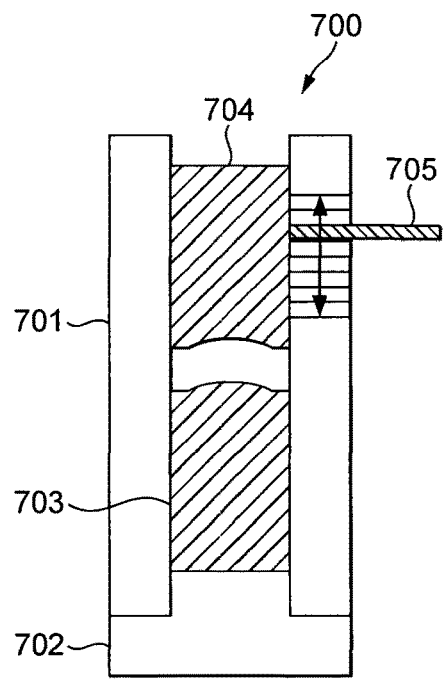
FIG. 20 provides a schematic diagram of a substrates alignment tube.
Figure 21:
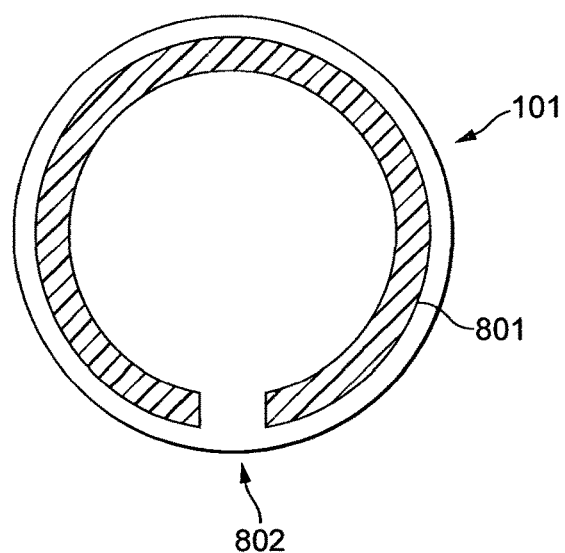
FIG. 21 provides a schematic diagram of a liquid crystal device in accordance with an example embodiment of the present invention.

At step S604 the substrates are adhered to one another to form a liquid crystal cavity. Standard techniques for the sealing and spacing of planar liquid crystal cells may be inappropriate for the liquid crystal devices of the embodiments due to their circular geometry and curved surfaces. Typical liquid crystal layers or cells include a spacer to separate the glass substrates, which are then sealed with UV curable glue along two of the edges. In the case of the liquid crystal layers in the previously described embodiments, the placement of the two substrates is crucial in ensuring correct liquid crystal alignment due to the rotational symmetry of the curved surfaces. Additionally, any mechanism for filling the cavity may require a single opening. In order to align the substrates of the previously described embodiments, the substrates may be put together using a custom built alignment tube to ensure the two lenses are correctly positioned as shown in FIG. 20. The alignment tube 700 includes alignment tube walls 701 and a plug 702 to secure a lower mould 703 which is shaped to the inverse of the posterior of the lower substrate, where the walls and plug may be formed from Perspex for example. The alignment tube also includes an upper mould 704 shaped to the inverse of the anterior of the upper substrate and a mechanism 705 configured to lower the upper mould, which for may be a vacuum attachment system for example. The rubbing directions of the two substrates should be parallel and hence correct orientation of the substrates is crucial for correct device operation. A ring of epoxy adhesive, such as Araldite for example, may be used to seal the device along the spacer joint due to its chemical inertness towards liquid crystal materials and high strength adhesion, with a small zone left unsealed to allow the device to be filled. However, other adhesive with similar properties may also be used. FIG. 20 provides a top down view of a liquid crystal device as described with reference to FIG. 1 where the adhesive 801 has been highlighted and 802 represents the gap which has been left in order to allowing filling of the cavity with liquid crystal. The steps for the adhering of the substrates is summarised in Table 3 below At step S605 the cavity formed by the adhesion of the substrates is filled with liquid crystal. However, it may not be suitable to apply some existing filling techniques to the curved substrates devices of the example embodiments. In existing planar devices there are generally two openings present at each end of the device and therefore capillary action may be used as a simple method of filling the device, with liquid crystal material deposited upon one of the open ends of the cell. The thin opening in the device results in the liquid crystal filling the empty cell via adhesive and surface tension forces. In the case of the curved substrates of the present example embodiments, the circular geometry of the substrate may prevent capillary filling, and an alternative technique may be required.

TABLE 3

| Step | Process |
| --- | --- |
| 1 | Treat substrates with an alignment agent with the rubbing direction clearly marked. |
| 2 | Place lower substrate upon the lower mould, with adhesion by wetting the surface with DI water. |
| 3 | Coat two small regions of the outer substrate with epoxy adhesive |
| 4 | Temporarily attach the upper substrate to the upper mould, by wetting the surface with DI water. |
| 5 | Line up the alignment marks created in Step 1 and place the upper mould in the alignment tube. |
| 6 | Lower the upper mould into place until the substrates make contact. |
| 7 | Leave epoxy adhesive to dry in the alignment tube, with pressure applied to the top mould to ensure that the system remains correctly positioned. |
| 8 | Remove device and seal the edges of the substrates using epoxy adhesive, with a small gap left for filling the cell. |

An example of an appropriate method that may be used to the fill these liquid crystal cavities involves the use of a vacuum and a liquid crystal bath, however other appropriate processes which are known in the art may also be used. To perform this method the device is placed into a chamber that is then pumped down to a vacuum. The gap in the liquid crystal device is placed into a liquid crystal material after evacuation and fully immersed to prevent air entering the cavity. The system is then vented, which results in a pressure difference between the inside of the cavity and the surrounding area, resulting in the device becoming filled. The key feature of such a system is that the device should be able to be placed into liquid crystal under approximate vacuum conditions. An example method for this process may utilise a bellows vacuum system and whereby the device is mechanically lowered into a liquid crystal. Lowering the device into the liquid crystal fully covers the filling gap 802 and hence allows vacuum filling when the chamber is pressurised. A step-by-step description of the example process is given in Table 4 below. A schematic diagram of an example filling system 90 which may be used to perform the procedure above is given by FIG. 22 where the system includes a bellows 901, a device holder 902, a liquid crystal bath 903 and a liquid crystal device 904.

TABLE 4

| Step | Process |
|---|---|
| 1 | Place liquid crystal device into the device holder attachment and fill the liquid crystal bath with the desired liquid crystal. |
| 2 | Seal the chamber and evacuate the chamber to approximately 5 Torr. |
| 3 | Continue pumping the system until all air removed from the liquid crystal and liquid crystal device. |
| 4 | Lower the liquid crystal device into the liquid crystal bath until the opening gap in the liquid crystal device is completely covered. |
| 5 | Vent the system slowly until atmospheric pressure using a needle valve to reduce the possibility of air pockets in the liquid crystal device. |
| 6 | Remove the liquid crystal device and seal the gap with an epoxy adhesive. |

An alternative process to fill the device with a liquid crystal involves the use of directly applying a droplet of liquid crystal to the device before sealing the substrates together. The volume of the liquid crystal layer cavity is calculated and deposited upon the surface of the substrate using a pipette. Glue is then applied and the device is constructed as described previously in Table 3. As the device is sealed the liquid crystal drop spreads out to fill the optical region of the liquid crystal layer. This allows the vacuum filling process to the removed and simplifies construction.

Figure 25:
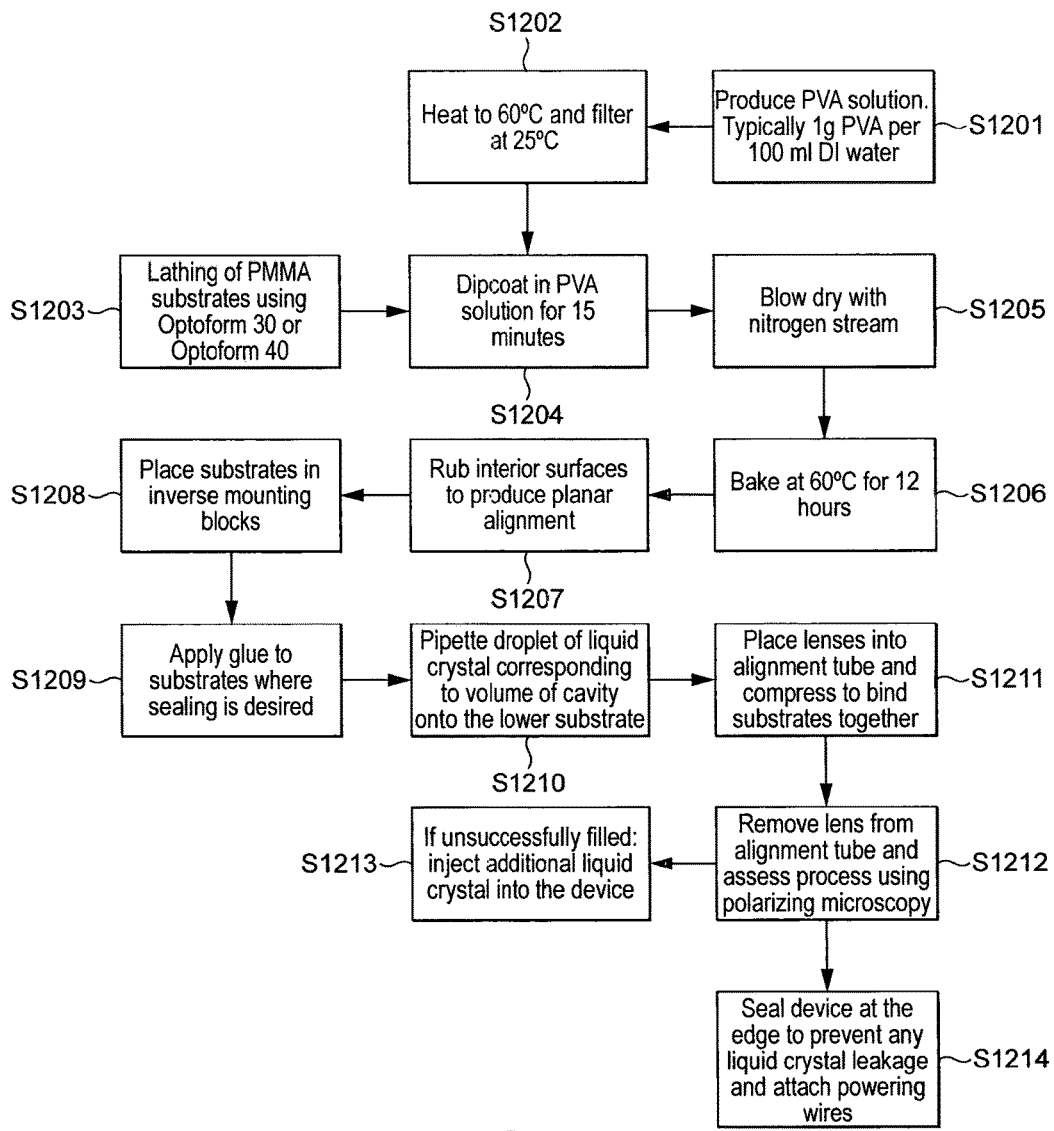
FIG. 25 provides a flow diagram of an example construction process of a liquid crystal device using single drop filling.
Figure 26:
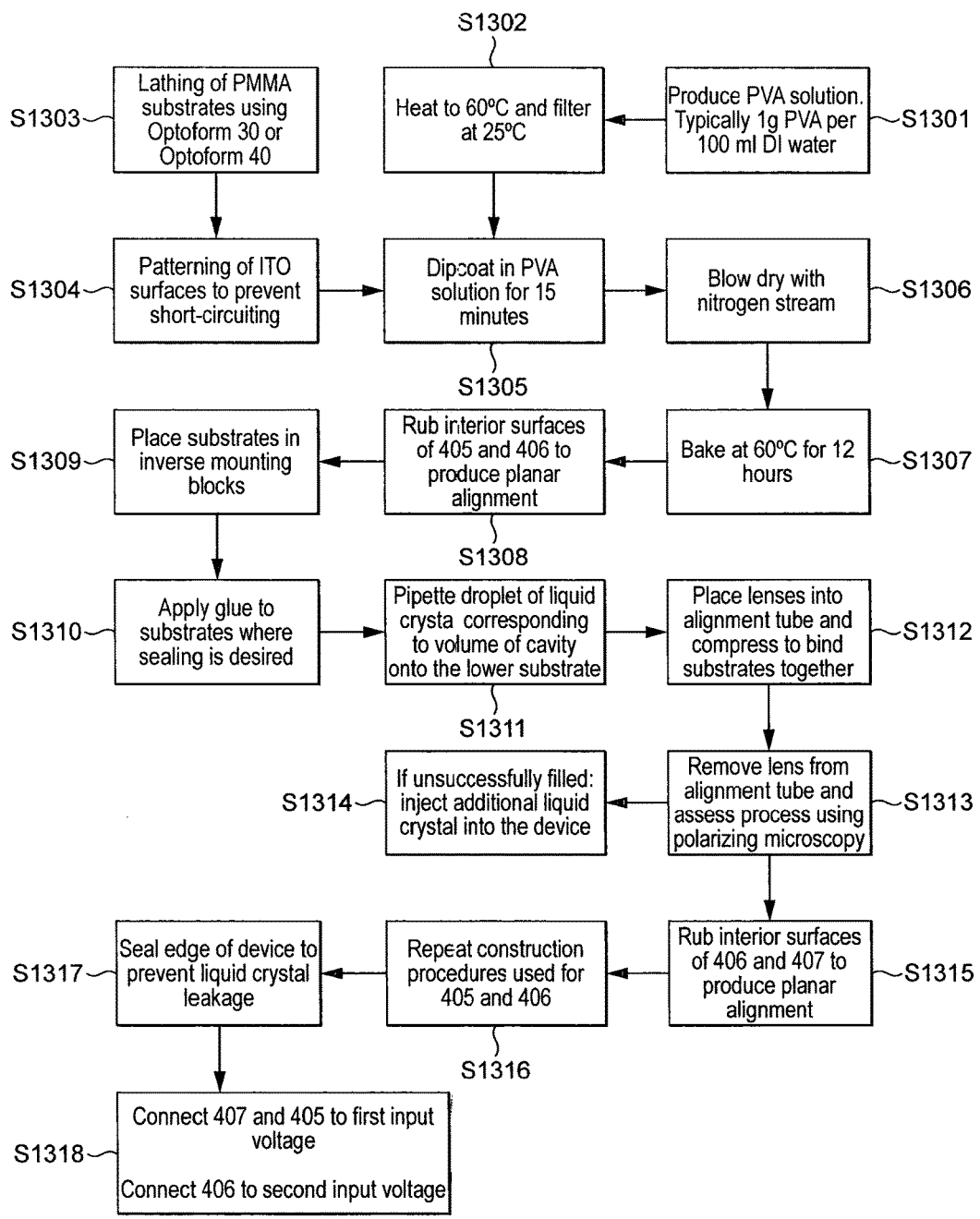
FIG. 26 provides a flow diagram of an example construction process of a polarization independent liquid crystal device.

An example of a construction process is shown in FIG. 25 and described in Table 5, where the process corresponds to the construction of a device as shown in FIG. 3. An additional example construction process is shown in FIG. 26 and described in Table 6, where the process corresponds to the construction of a device as shown in FIG. 4.

TABLE 5

| Step | Process |
|---|---|
| S1201 | Produce PVA solution 1 g PVA to 100 ml water |
| S1202 | Dissolve at 60 C. and filter at room temperature |
| S1203 | Cut two PMMA lenses using Optomform 80 lathe |
| S1204 | Dipcoat lenses in PVA for 15 minutes |
| S1205 | Blow dry with N2 steam |
| S1206 | Bake at 60 C. for 12 hours |
| S1207 | Rub convex surface using standard procedures - Rub concave surface with ball bearing based cloth |
| S1208 | Place together using inverse mounts and alignment tube - pieces kept in place using wet surfaces and surface forces |
| S1209 | Apply glue to the lower substrate manually |
| S1210 | Place droplet of liquid crystal on both lenses to wet the surface |
| S1211 | Place lenses together in alignment tube and glue binds to both surfaces |
| S1212 | Remove lens from alignment tube and test filling using polarizing microscopy |
| S1213 | If filling is unsuccessful inject with liquid crystal using syringe |
| S1214 | Seal lens and attached powering wires |

In some examples a glue robot may used in Step S1209 to place a precise amount of glue for sealing.

TABLE 6

| Step | Process |
|---|---|
| S1301 | Produce PVA solution 1 g PVA to 100 ml water |
| S1302 | Dissolve at 60C and filter at room temperature |
| S1303 | Cut three PMMA lenses using Optomform 80 lathe |
| S1304 | Pattern of surfaces with ITO to prevent short circuits |
| S1305 | Dipcoat lenses in PVA for 15 minutes |
| S1306 | Blow dry with N2 steam |
| S1307 | Bake at 60 C. for 12 hours |
| S1308 | Rub convex surface of LC3 using standard procedures - Rub concave surface of LC2 with ball bearing based cloth |
| S1309 | Place together using inverse mounts and alignment tube |
| S1310 | Glue is applied to the lower substrate manually |
| S1311 | Place droplet of liquid crystal on both lenses to wet the surface |
| S1312 | Place lens together in alignment tube and glue binds to both surfaces |
| S1313 | Remove lens from alignment tube and test filling using polarizing microscopy |
| S1314 | If filling is unsuccessful inject with liquid crystal using syringe |
| S1315 | Rub convex surface of LC2 using standard procedures - Rub concave surface of LC1 with ball bearing based cloth |
| S1316 | Repeat filling and construction with LC1 attached |
| S1317 | Seal lens using glue |
| S1318 | Connect both surfaces of LC2 using conductive paint and attached to one wire for operating voltage 1 - Connect LC1 and LC3 to wires and connect both to operating voltage 2 |

In some examples, a glue robot may used in Step S1310 to place a precise amount of glue for sealing. Furthermore, the patterning of Step S1304 may be conducted using one or more of laser ablation, rubber masking prior to ITO application, photolithography, physical masking plus and so forth. However, it may be beneficial if when applying ITO outgassing is reduced and if a surface is contaminated the lens may not fill correctly. In some examples, plasma-etching treatment may be used to improve the wettability of the device using Ag and O plasma if a surface is contaminated. Alternatively, organic contaminants may be removed by exposing the surface to $UV-O_3$.

Once the processes described above have been completed and the liquid crystal devices of FIGS. 1 and 2 manufactured, it is necessary to provide power to the electrodes in order to switch the liquid crystal device between optically inactive and optically active states. The fabrication and construction of the lens prior to electrical connection is similar to that described in previous sections. However, if the glue which is used to adhere the substrates to one another is not electrically insulating, in order to electrically insulate the lens at the surface interfaces, it may be necessary to apply a thin transparent insulating layer of a substance, such as an ultraviolet curable glue, in a ring along the lens join. However, patterning of the conductive coating may also be used to provide insulation at the surface interfaces and prevent short circuits.

Figure 22:
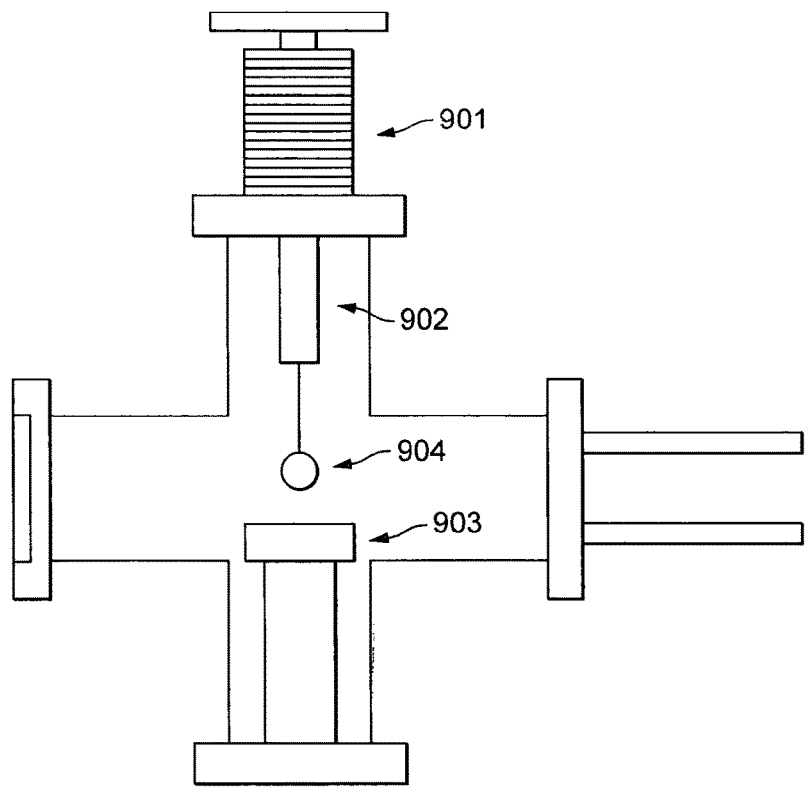
FIG. 22 provides a schematic diagram of a liquid crystal device filling system.
Figure 23:
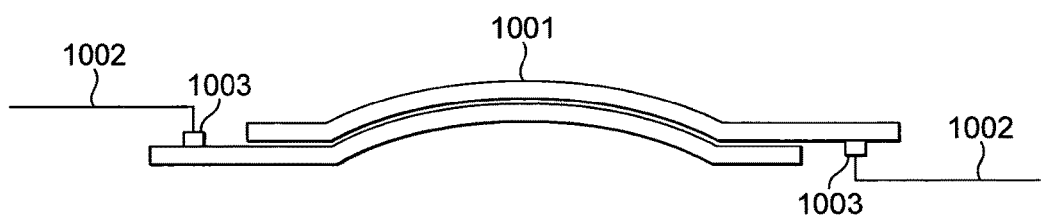
FIG. 23 provides a schematic diagram of a liquid crystal device in accordance with an example embodiment of the present invention.
Figure 24:
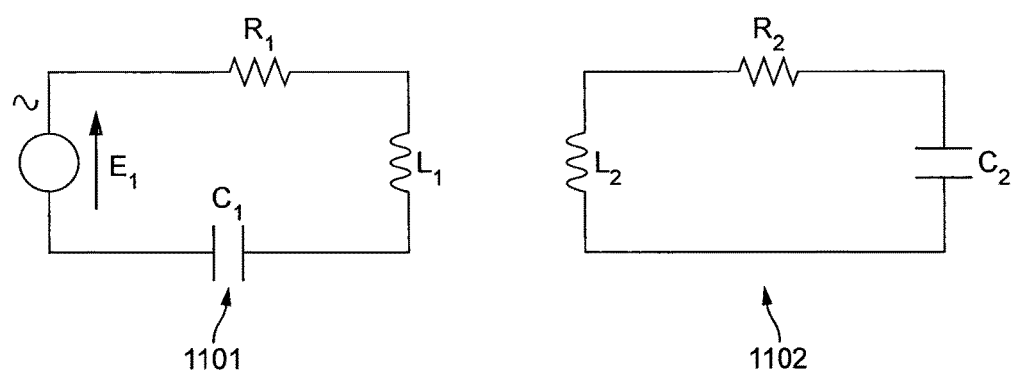
FIG. 24 provides a schematic diagram of a wireless power circuit.

In some example embodiments it may be necessary to connect operating wires to the device. However, conventional soldering using indium for glass devices may be inappropriate because of the high temperatures associated with its use and the low melting and glass transitional temperatures of materials that may be used for the substrates such as PMMA. One alternative is to use an organic-based adhesive for wire attachment due to the lack of solvents, room temperature curing and high viscosity (after dehydration). FIG. 22 illustrates the attachment of wires to a device 1001 similar to that illustrated in FIG. 3. In FIG. 22 a portion of the substrate has been cut away at each side in order to allow the wires 1002 to be attached to the appropriate substrates with an adhesive or solder such as carbon glue 1003.

In liquid crystal devices suitable for use in contact lenses it is unlikely that the use of wires will be practical and or that there will be flat surfaces to attach wires to. In one example embodiment, the liquid crystal devices of FIGS. 1 and 2 may be powered wirelessly. Two induction coils may be used to transfer energy wirelessly from one circuit to the other, where one coil would be built into the device and the other would be nearby. The electrical power would then be transferred via induction where the driving coil and the receiving coil have similar electrical resonant frequencies where this resonance tuning may be achieved by adjusting the inductance and capacitance of the circuits. An example of such an inductor circuit is illustrated in FIG. 11, where driving circuit 1101 would be positioned nearby to the user's eye and receiving circuit 1102 would be contained with the liquid crystal device or contact lens, and the induced current and resulting voltage used to power the electrodes. The size of the receiver coil determines the efficiency of transfer, with theoretical work showing that receiver coils in the order of millimeters can be powered by larger centimeter or decimeter sized transmitting coils. Due to the low powering requirements of the previously described embodiments, such a system is feasible for operation and also addresses the control issues, with the device responding to an external circuit as opposed to have any inbuilt control mechanism.

An alternative method of powering and operation of the embodiments include using a battery internal to the liquid crystal device. A disadvantage of this system is that electrical control is still required, and hence a control antenna may need to be included the liquid crystal device. However, the use of a battery may be beneficial because of the increased range of radio control compared to wireless powering. In some embodiments control circuitry may be included with liquid crystal device so that the liquid crystal device does not require remote interaction with external control elements. For instance, control circuitry responsive to light stimuli and or movement of the liquid crystal device via the use of a photodiode or accelerometer, respectively may be included in the liquid crystal device as means to control the liquid crystal device.

The previously described embodiments may be adapted in a number of ways which may be beneficial to their performance. An example of such an alternation would be to reduce the thickness of the liquid crystal layer of the device, which may lead to reduced scattering and reduced switching times. However, achieving thin liquid crystal layers i.e. approximately 5 µm may be dependent on the limitations of the fabrication techniques in providing uniform separation while maintaining electrical insulation. An improvement to the described embodiments may use a uniform covering of a photo-curable insulator, such as SU-8 2000.5 for example, over the whole device, with areas requiring connection to the powering wires shielded mechanically, although insulation and shielding may also be provided using other known means and materials. The photo-curable insulator layer may be applied using a spin coater to provide uniform coverage, with uniform spin coating applicable for curved surfaces, and then flood exposed to a UV light source and cured at low temperature. A process such as this may also be designed not to require chemical development, thus possibly removing the need for solvent resistance of the substrates.

An alternative method of providing electrical insulation is direct ablation of the ITO layer using laser light. An example ablation pattern 1401 is shown in FIG. 27 for the device shown in FIG. 3. The substrates are orientated whereby the ITO coated surfaces are unable to touch when sealed, with the region of physical contact shown as 1402, preventing short circuits. In addition, a physical mask can be used to pattern the electrodes. A mask can be placed upon the substrates before ITO coating preventing ITO coating of selected regions covered by the mask. In order for the mask to be effective, direct contact with the substrates may be required and the material should preferably not outgas upon vacuum. Patterning the electrodes upon the device can also be achieved using inkjet printing, where a conductive polymer such as PEDOT:PSS (Poly(3,4-ethylenedioxythiophene) Polystyrene sulfonate) can be directly placed onto the substrates in the desired pattern. Improvements to the conductivity of PEDOT can be achieved by specific treatments, for example dimethyl sulfoxide emplura. In addition, for any electronic connections outside the optical region can be providing by printing silver nanoparticles. Electrodes may also include graphene and graphene based materials to provide transparent conductive surfaces.

Figure 28:
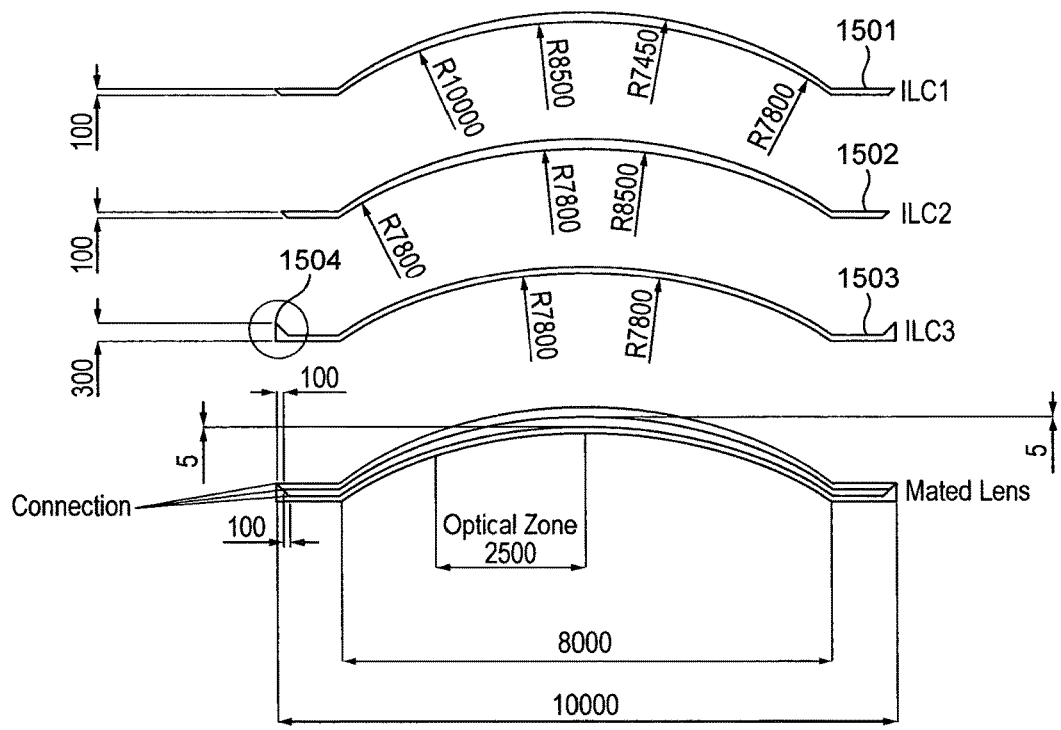
FIG. 28 provides an example lens design for producing a polarization independent device using two liquid crystal cavities.
Figure 29:
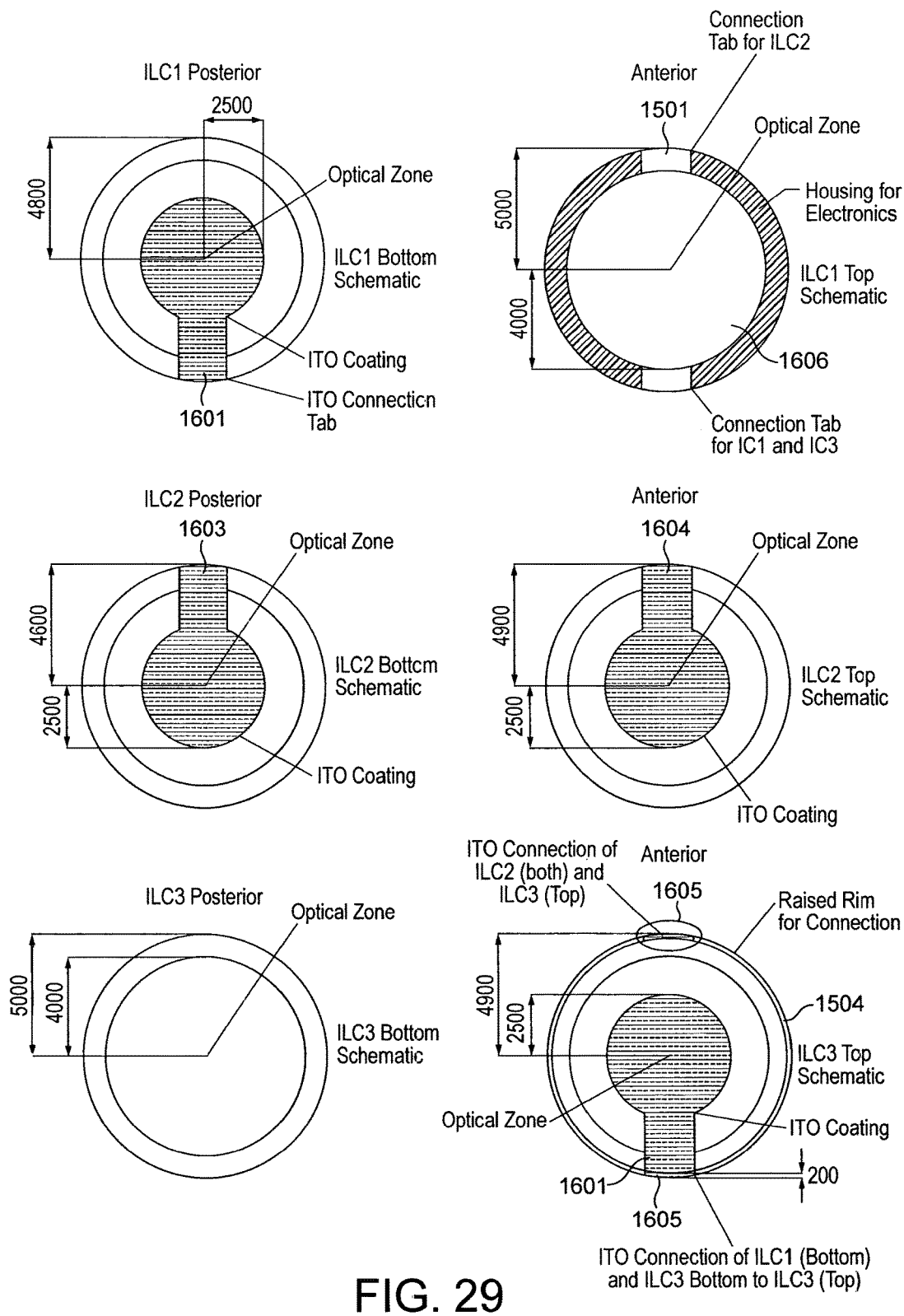
FIG. 29 provides an example design for powering and electrically connecting the device shown in FIG. 28.

An example device using a slotted substrate system to provide substrate alignment and electrical connections within the device is shown in FIG. 28 and FIG. 29. With the device in these Figures, the substrates 1501 and 1502 are arranged to slot into the raised region on substrate 1503 (shown as 1504). This increases the likelihood that the substrates are correctly aligned and may remove the need for several construction processes shown in FIG. 25 and FIG. 26, as no alignment tube is required. The device can be constructed using a drop filling process and sealed using UV curable glue. The schematic of FIG. 28 shows how the polarization independent lens using two liquid crystal layers is able to slot together using a raised ridge 1504. The liquid crystal cavities contained between the surfaces of 1501 and 1502, and 1502 and 1503 may take the shape of a negative meniscus lens, with the liquid crystal director perpendicular in each cavity. The combination of the two liquid crystal lenses results in the same optical power in the device regardless of the polarization of light being focussed due to the orientation of the liquid crystal director. The device is sealed at the edge of the device. FIG. 29 is a schematic of a method of patterning the ITO on a lens system with three substrates as shown in FIG. 28. The ITO is patterned to prevent short circuiting when the substrates are placed together as shown in FIG. 15 while using the raised ridge on 1504 to provide electrical contacts to the top of 1501. 1601 connects to 1605 to provide the same electric potential to each electrode, while 1603 and 1604 are connected to 1605 to provide the same second value of electric potential to the central electrodes. 1605 the connects to 1501 to allow connection to the electronics which may be placed on the top surface of the device.

An advantage of the example device is that the electrical connections can be provided using the ridge in 1504. An example electrode pattern and connection scheme is shown in FIG. 28. The same voltage is applied to 1601 and 1602, with the electrodes 1603 and 1604 grounded. Other embodiments of electrical connections to the substrates can also be made using the technique described for different optical functions. Two connection tabs are provided 1605, one for 1601 and 1602 and another for 1603 and 1604. Electronics for operation can be placed upon 1501 outside the central 5 mm optical diameter zone 1606. This region for electronics may be connected to 1605 for operation of the different electrodes. Patterning for the electrodes may be completed using either patterned ITO or printed conductive polymer. The electronics contained on 1606 may include a supercapacitor, small battery, antenna, RC circuit or another method of powering the lens and connections to the tabs using a conductive material.

Lenses may be manufactured in a fashion more suited to large scale commercial exploitation. Each lens mother—substrate would be mounted onto a chuck (such as a vacuum chuck) that allows for mounting of multiple units. This chuck would then allow suitable fabrication of each lens element using, for example, lathing or moulding. The central axis of the lenses would be accurately defined with respect to fiducial marks on the chuck. Once the internal surface of the lens is formed, the additional layers may be ink-jet-printed on to the lens surface. For example, barrier layers, electrode layers and/or glue layers may be incorporated onto the surfaces whilst each lens remains mounted into the chuck. The second and third lens elements may be manufactured in parallel in a similar way. Once the elements are ready to mount together the chucks can be brought together and centralised accurately. If a vacuum chuck is used then one of the sets of lens elements may be removed from the chuck and locked into place on the other lens by applying positive pressure to the vacuum chuck. This may be done lens by lens or in parallel. For systems where a single drop fill is used and the correct amount of liquid crystal is deposited on one of the lens elements, it may be preferable to ensure that the chuck employs sufficient pressure to distort the lens and allow some of the LC to exhaust from the element thereby preventing air bubbles from forming. Printing steps may then be conducted on the outer surface of the second element before the third element is mounted in a similar fashion.

Additionally alternative materials to PMMA may be used to form the substrates for the liquid crystal device, such as various Rigid Gas Permeable (RGP) materials. The construction processes described have been shown to be appropriate for these materials and can provide improved oxygen transport to the eye. The material also provides the rigid structure required for successful operation of the device. In addition, the device may be constructed using materials that are able to withstand the cleaning regime associated with regular contact lens use.

In addition, other non-liquid crystalline materials which possess an electric field or voltage response to refractive index can be used in the current device, with the curvatures of the interior of the device able to produce a similar change in refractive index of phase-change materials such as germanium antimony tellurium alloys (Hosseini et al., Nature, 511, 206-511, 2014).

Various modifications may be made to the example embodiments herein before described without departing from the scope of the present disclosure. For example, although example embodiments of the present disclosure have been described with reference to use in a contact lens, they may also be used in other applications such as microscopy where adaptable lenses or focussing is required. Furthermore, specified materials are given as an example only and other suitable materials may also be used. The herein before described processes to manufacture the liquid crystal devices are for example only and may also be adapted for use with different materials. For instance steps may be skipped, substituted or order rearranged without departing from the scope of the present disclosure.

The invention claimed is:

1. A liquid crystal device for focusing visible light, the liquid crystal device comprising:
a plurality of curved substrates arranged to form one or more curved cavities therebetween, each substrate being configured to provide a focal power, wherein the one or more curved cavities contain liquid crystal and form one or more liquid crystal elements, each of the one or more liquid crystal elements being configured to provide a focal power, the focal power of each of the liquid crystal elements being dependent on the curvature of the respective cavity and a voltage applied across the liquid crystal contained within the respective cavity, and wherein the substrates in combination with the one or more liquid crystal elements are arranged to provide a first focal power in a substantial absence of an applied voltage and a second focal power in response to an applied voltage, wherein surfaces, of the plurality of curved substrates arranged to form at least one curved cavity therebetween, that are in contact with at least one of the liquid crystal elements, have different curvature radii and wherein the at least one of the liquid crystal elements has a non-uniform thickness and takes on the shape of the at least one curved cavity formed by the surfaces of the plurality of curved substrates.

2. A liquid crystal device as claimed in claim 1, wherein the second focal power is more positive than the first focal power.

3. A liquid crystal device as claimed in claim 1, wherein the first focal power is substantially zero.

4. A liquid crystal device as claimed in claim 1, wherein the liquid crystal device is arranged to provide the second focal power in response to the applied voltage exceeding a predetermined threshold voltage.

5. A liquid crystal device as claimed in claim 1, wherein an aggregate focal power provided by the one or more substrates is positive or negative.

6. A liquid crystal device as claimed in claim 1, wherein the liquid crystal device comprises three substrates arranged to form two curved cavities therebetween.

7. A liquid crystal device as claimed in claim 1, wherein the liquid crystal device comprises three parallel substrates forming two substantially parallel cavities and one of the three substrates forms a wall of each of the two cavities.

8. A liquid crystal device as claimed in claim 1, wherein the liquid crystal device comprises two liquid crystal elements and the liquid crystal directors of the liquid crystal of each of the liquid crystal elements are substantially orthogonal.

9. A liquid crystal device as claimed in claim 1, wherein surfaces of the substrates that form the one or more cavities each comprise an electrode, the electrodes of each cavity configured to apply the voltage to the liquid crystal contained in the respective cavity.

10. A liquid crystal device as claimed in claim 9, wherein the liquid crystal device comprises three substrates which form two liquid crystal elements and the electrodes are arranged to apply a first voltage across the liquid crystal of a first of the two liquid crystal elements and to apply a second voltage across the liquid crystal of a second of the two liquid crystal elements.

11. The liquid crystal device as claimed in claim 9, wherein the liquid crystal device comprises a battery configured to provide electrical power to the electrodes.

12. A liquid crystal device as claimed in claim 9, wherein the liquid crystal device comprises a receiver induction coil, the receiver induction coil configured to receive electrical power from a transmitter induction coil, and provide the received electrical power to the electrodes.

13. A method of manufacture of the liquid crystal device of claim 1, the method including:
  manufacturing a plurality of curved substrates,
  applying a conductive coating to one or more of the surfaces of each of the substrates, the conductive coating configured to form an electrode on each of the one or more surfaces, processing the conductive coated substrate surfaces to form a liquid crystal alignment inducing surface,
  adhering at least two substrates to one another to form one or more cavities therebetween, the liquid crystal alignment inducing surfaces forming interiors of the one or more cavities, and
  filling the one or more cavities with liquid crystal.

14. The method of manufacture of claim 13, wherein the filing of the one or more cavities with liquid crystal includes submersing, in a substantial vacuum, the adhered substrates in liquid crystal.

15. The method of manufacture of claim 13, wherein the applying the conductive coating includes applying the conductive coating via cold vacuum sputtering.

16. The method of manufacture of claim 13, wherein the applying the conductive coating includes applying a coating configured to increase the adherence of the conductive coating to the one or more surfaces of the substrates.

17. Use of a method according to claim 13 in the manufacture of a contact lens.

18. A contact lens including a liquid crystal device according to claim 1.

19. A contact lens as claimed in claim 18, wherein the contact lens is formed from a rigid gas permeable material or from a soft contact lens material.

20. Use of a liquid crystal device according to claim 1 in the manufacture of a contact lens.

\* \* \* \* \*